(12) United States Patent
Solano Arenas et al.

(10) Patent No.: US 11,533,716 B2
(45) Date of Patent: Dec. 20, 2022

(54) FLEXIBLE SHORT TRANSMISSION TIME INTERVAL (TTI) RESOURCE ALLOCATION

(71) Applicant: Telefonaktiebolaget LM Ericsson (publ), Stockholm (SE)

(72) Inventors: John Camilo Solano Arenas, Dusseldorf (DE); Niklas Andgart, Södra Sandby (SE); Laetitia Falconetti, Järfälla (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 610 days.

(21) Appl. No.: 16/306,443

(22) PCT Filed: Aug. 10, 2018

(86) PCT No.: PCT/EP2018/071745
§ 371 (c)(1),
(2) Date: Nov. 30, 2018

(87) PCT Pub. No.: WO2019/030376
PCT Pub. Date: Feb. 14, 2019

(65) Prior Publication Data
US 2021/0227512 A1    Jul. 22, 2021

Related U.S. Application Data

(60) Provisional application No. 62/544,691, filed on Aug. 11, 2017.

(51) Int. Cl.
*H04W 72/04* (2009.01)

(52) U.S. Cl.
CPC ...... *H04W 72/042* (2013.01); *H04W 72/0446* (2013.01)

(58) Field of Classification Search
CPC . H04W 52/283; H04W 72/04; H04W 72/042; H04W 12/041; H04W 72/1273;
(Continued)

(56) References Cited

U.S. PATENT DOCUMENTS

| | | | |
|---|---|---|---|
| 2017/0201977 A1* | 7/2017 | Han | H04W 52/283 |
| 2017/0230154 A1 | 8/2017 | Tavildar et al. | |

(Continued)

FOREIGN PATENT DOCUMENTS

| | | |
|---|---|---|
| WO | 2017018618 A1 | 2/2017 |
| WO | 2018083260 A1 | 5/2018 |

(Continued)

OTHER PUBLICATIONS

Ericsson: 3GPP TR 36.881 V14.0.0 (Jun. 2016); 3rd Generation Partnership Project; Technical Specification Group Radio Access Network;Evolved Universal Terrestrial Radio Access (E-UTRA); Study on latency reduction techniques for LTE (Release 14); Consisting of 249 pages.

(Continued)

*Primary Examiner* — Chi Ho A Lee
(74) *Attorney, Agent, or Firm* — Christopher & Weisberg, P.A.

(57) ABSTRACT

A network node, wireless device and methods for short transmission time interval, sTTI, resource allocation in a communication network are provided. The network node includes processing circuitry configured to determine a downlink control information, DCI, message. The DCI message includes a bit field of at least two bits. Each bit corresponds to a group of at least one short Control Channel Element, sCCE, of a configured sPDCCH region. The processing circuitry is configured to transmit the DCI message (Continued)

to a wireless device. The bit field indicates whether the group of at least one sCCE is used for data transmission to the wireless device.

24 Claims, 25 Drawing Sheets

(58) Field of Classification Search
CPC . H04L 27/2613; H04L 5/0053; H04L 5/0051; H04L 1/0031
See application file for complete search history.

(56) References Cited

U.S. PATENT DOCUMENTS

| | | | |
|---|---|---|---|
| 2017/0230994 | A1 | 8/2017 | You et al. |
| 2017/0290004 | A1 | 10/2017 | Yang et al. |
| 2018/0049166 | A1 | 2/2018 | Sun et al. |
| 2018/0049175 | A1 | 2/2018 | Bagheri et al. |
| 2018/0124744 | A1 | 5/2018 | Xue et al. |
| 2018/0132272 | A1 | 5/2018 | Sun et al. |
| 2018/0167915 | A1* | 6/2018 | Lee ................... H04W 12/041 |
| 2018/0206266 | A1 | 7/2018 | Byun et al. |
| 2018/0227889 | A1 | 8/2018 | Yang |
| 2018/0227939 | A1* | 8/2018 | Bagheri ............ H04W 72/1273 |
| 2018/0242289 | A1 | 8/2018 | Andgart et al. |
| 2018/0309489 | A1* | 10/2018 | Hosseini ............... H04L 1/0031 |
| 2018/0324018 | A1* | 11/2018 | Hosseini ............ H04L 27/2613 |
| 2018/0359733 | A1* | 12/2018 | Bagheri ............... H04L 5/0051 |
| 2018/0359742 | A1* | 12/2018 | Patel .................. H04W 72/042 |
| 2018/0375636 | A1* | 12/2018 | You ...................... H04L 5/0053 |
| 2019/0052332 | A1 | 2/2019 | Shimezawa |
| 2019/0053208 | A1* | 2/2019 | Zhang ................ H04W 72/042 |
| 2019/0098622 | A1 | 3/2019 | Lee et al. |
| 2019/0229879 | A1 | 7/2019 | Yi et al. |
| 2019/0281623 | A1* | 9/2019 | Andgart ................ H04W 72/14 |
| 2019/0306737 | A1 | 10/2019 | Kwak et al. |
| 2020/0127783 | A1 | 4/2020 | Kwak et al. |
| 2020/0305129 | A1* | 9/2020 | Lee ...................... H04L 5/0053 |
| 2021/0120537 | A1 | 4/2021 | Lei et al. |

FOREIGN PATENT DOCUMENTS

| | | |
|---|---|---|
| WO | 2018141597 A1 | 8/2018 |
| WO | 2018141931 A1 | 8/2018 |
| WO | 2018202893 A1 | 11/2018 |

OTHER PUBLICATIONS

Nokia Alcatel—Lucent Shanghai Bell: "On design of search space for short PDCCH", 3GPP Draft; R1-1612211_on Design of Search Space for Short PDCCH, 3rd Generation Partnership Project (3GPP), Mobile Competence Centre; 650, Route Des Lucioles; F-06921 Sophia-Antipolis Cedex; Franc, vol. RAN WGL, No. Reno, Nevada, U.S.A; Nov. 14, 2016-Nov. 18, 2016 Nov. 13, 2016 (Nov. 13, 2016)—Consisting of 6 pages.
Catt: "Design on sPDCCH multiplexing with data", 3GPP Draft; R1-1707433, Generation Partnership Project (3GPP), Mobile Competence Centre; 650, Route Des Lucioles; F-06921 Sophia-Antipolis Cedex; France, vol. RAN WG1, No. Hangzhou; May 15, 2017-May 19, 2017 May 14, 2017 (May 14, 2017)—Consisting of 2 pages.
International Search Report and Written Opinion dated Jan. 21, 2019, for related International Application No. PCT/EP2018/071683; International Filing Date: Aug. 9, 2018 consisting of 22-pages.
Huawei et al.: Discussion on sPDCCH design:, 3GPP Draft; R1-1704264, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017 Apr. 2, 2017 (Apr. 2, 2017)—Consisting of 16 pages.
International Search Report and Written Opinion dated Oct. 24, 2018, for corresponding International Application No. PCT/EP2018/071745; International Filing Date: Aug. 10, 2018 consisting of 14-pages.
Ericsson: System level evaluation of short TTI; R1-163312; 3GPP TSG RAN WG1 Meeting #84 bis;Busan, Apr. 11-15, 2016; Consisting of 11 pages.
Ericsson: On sTTI scheduling options; 3GPP TSG-RAN WG1 #87 R1-1611511; Reno, USA, Nov. 14-18, 2016; Consisting of 4 pages.
Ericsson: Design aspects of sPDCCH; 3GPP TSG-RAN WG1 Meeting #90 R1-1712895; Prague, Czech Republic, Aug. 21-25, 2017; Consisting of 12 pages.
Ericsson: Search space for sTTI; 3GPP TSG-RAN WG1 Meeting #90 R1-1712896; Prague, Czech Republic, Aug. 21-25, 2017; Consisting of 8 pages.
HTTP Archive-Trends: Desktop Mobile; http://httparchive.org/trends.php; Aug. 9, 2017; Sponsors; Google Mozilla; New Relic; O'Reiley Media; Etsy; dynaTrace; Instart Logic; Catchpoint Systems; Fastly; SOASTA mPulse and hosting Facts; Consisting of 6 pages.
Ericsson: New Work Item on shortened TTI and processing time for LTE; 3GPP TSG RAN Meeting #72 RP-161299; Busan, Korea, Jun. 13-16, 2016; Consisting of 9 pages.
Ericsson: 3GPP TS 36.213 V14.3.0 (Jun. 2017; 3rd Generation Partnership Project; Technical Specification Group Radio Access Network; Evolved Universal Terrestrial Radio Access (E-UTRA); Physical layer procedures (Release 14); Consisting of 460 pages.
Ericsson: Revised Work Item on shortened TTI and processing time for LIE ; 3GPP TSG RAN Meeting #75 RP-170xxx; Dubrovnik, Croatia, Mar. 6-9, 2017 (revision of RP-162014); Consisting of 5 pages.
Ericsson: 3GPP TS 36.211 V14.3.0 (Jun. 2017); 3rd Generation Partnership Project; Technical Specification Group Radio Access Network; Evolved Universal Terrestrial Radio Access (E-UTRA); Physical channels and modulation (Release 14); Consisting of 195 pages.
Ericsson: Design aspects of sPDCCH—3GPP TSG-RAN WG1 Meeting #88bis R1-1706075; Spokane, US, Apr. 3-7, 2017; Consisting of 8 pages.
Ericsson: Multiplexing sPDCCH with sPDSCH/PDSCH: 3GPP TSG-RAN WG1 Meeting #89 R1-1708864 Hangzhou, P.R. China, May 15-19, 2017; Consisting of 6 pages.
U.S. Office Action dated Jun. 9, 2021 for U.S. Appl. No. 16/300,445, filed Nov. 9, 2018, consisting of 9 pages.
3GPP TSG RAN # 75 RP-170013 MCC TF160 Status Report; Olivier Genoud; Task Force 160 Leader, 3GPP MC; Location and Date Dubrovnik, Croatia, Mar. 2017, consisting of 11 pages.
U.S. Notice of Allowance dated Apr. 26, 2022 for U.S. Appl. No. 16/300,445, filed Nov. 9, 2018, consisting of 15 pages.

* cited by examiner

| sRBG | 0 | 1 | 2 | 3 | 4 | 5 | 6 | 7 | 8 | 3-bit indicator of unused sCCEs for sPDSCH |
|---|---|---|---|---|---|---|---|---|---|---|
| | | | RA bitmap | | | | | | | |
| 1: | | 1 | 1 | 1 | | | | | | 100 |
| 2: UL | | | | | | | | | | |
| 3: | | | | | | 1 | 1 | 1 | 1 | |

FIG. 25

FLEXIBLE SHORT TRANSMISSION TIME INTERVAL (TTI) RESOURCE ALLOCATION

TECHNICAL FIELD

The disclosure relates to wireless communications, and in particular, to flexible resource allocation of short Transmission Time Intervals (TTI).

BACKGROUND

Latency Reduction with Short TTI Operation

Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation.

Shorter latency than previous generations of Third Generation Partnership Project (3GPP) Radio Access Technologies (RATs) was one performance metric that guided the design of Long Term Evolution (LTE). LTE is also recognized by the end-users to be a system that provides faster access to internet and lower data latencies than previous generations of mobile radio technologies.

Packet data latency is important not only for the perceived responsiveness of the communication system, but packet data latency is also a parameter that indirectly influences the throughput of the system. For example, HTTP/TCP is one common application and transport layer protocol suite used on the internet. The typical size of HTTP based transactions over the internet are in the range of a few 10's of Kbyte up to 1 Mbyte. In this size range, the TCP slow start period is a significant part of the total transport period of the packet stream. During TCP slow start, the performance is latency limited. Hence, improved latency may improve the average throughput, for this type of TCP based data transactions.

Radio resource efficiency could be positively impacted by latency reductions. Lower packet data latency could increase the number of transmissions possible within a certain delay bound, hence higher Block Error Rate (BLER) targets could be used for the data transmissions, thereby freeing up radio resources to potentially improve the capacity of the communication system.

One area of packet latency reduction relates to the reduction of transport time of data and control signaling, within the context of the length of a transmission time interval (TTI). In Long Term Evolution (LTE) release 8 (i.e., Third Generation Partnership Project (3GPP) Release 8, hereinafter referred to as Rel-8), a TTI corresponds to one subframe (SF) of length 1 millisecond. One such 1 ms TTI is constructed by using 14 OFDM or single-carrier frequency-division multiple access (SC-FDMA) symbols in the case of normal cyclic prefix and 12 OFDM or SC-FDMA symbols in the case of extended cyclic prefix.

Work in 3GPP (a standardization organization) is ongoing on standardizing "short TTI" or "sTTI" operation, where scheduling and transmission can be performed on a faster timescale. Therefore, the legacy LTE subframe is subdivided into several sTTI. In the following the legacy LTE subframe is also refer to as legacy TTI or long TTI. Supported lengths for sTTI are 2, 3 and 7 OFDM symbols. Additionally or alternatively to one or more of the aforementioned supported lengths, a supported length of 4 OFDM symbols may also be envisaged. A data transmission of length 7 OFDM symbols is typically referred to as a slot transmission, while a data transmission of length 2 or 3 OFDM symbols is typically referred to as a subslot transmission. Data transmission in downlink (DL), i.e., from the network node such as a base station to the wireless device, may occur per sTTI via the short Physical Downlink Shared Channel (sPDSCH) also called slot or subslot PDSCH, which may include a control region short Physical Downlink Control Channel (sPDCCH). In the uplink (UL), i.e., from the wireless device to the network node, data is transmitted per sTTI via a short Physical Uplink Shared Channel (sPUSCH) also called slot or subslot PUSCH, and control information can be transmitted via a short Physical Uplink Control Channel (sPUCCH).

Scheduling sTTI

Different alternatives are possible to schedule a sTTI in the UL, i.e., from the wireless device to the network node, or the DL, i.e., from the network node to the wireless device. In one alternative, individual wireless devices receive information about sPDCCH candidates for short TTI via RRC configuration, configuring wireless devices where to look for the control channel for short TTI, i.e., sPDCCH. The downlink control information (DCI) for sTTI is included directly in the sPDCCH. In another alternative, the DCI for sTTI is split into two parts, a slow DCI is sent in the Physical Downlink Control Channel (PDCCH) and a fast DCI is sent in the sPDCCH. The slow grant can contain the frequency allocation for a DL and an UL short TTI band to be used for short TTI operation. The slow grant can also contain refinement about sPDCCH candidate locations.

LIE Downlink Structure

3GPP LTE technology is a mobile broadband wireless communication technology in which transmissions from base stations (also referred to as network nodes) to mobile stations (also referred to as wireless devices) are sent using orthogonal frequency division multiplexing (OFDM). OFDM splits the signal into multiple parallel sub-carriers in the frequency domain. The basic unit of transmission in LTE is a resource block (RB) which in its most common configuration consists of 12 subcarriers and 7 OFDM symbols (one slot) in the case of normal cyclic prefix. In the case of extended cyclic prefix, a RB consists of 6 OFDM symbols in the time domain. A commonly used term is a physical resource block (PRB) that is used to indicate the RB in the physical resource. Two PRBs in the same subframe that use the same 12 subcarriers are denoted a PRB pair. This is the minimum resource unit that can be scheduled in LTE.

A unit of one subcarrier and 1 OFDM symbol is referred to as a resource element (RE) as illustrated in FIG. 1. Thus, a PRB consists of 84 REs. An LTE radio subframe is composed of multiple resource blocks in frequency with the number of PRBs determining the bandwidth of the system and two slots in time as illustrated in FIG. 2.

In the time domain, LTE downlink transmissions are organized into radio frames of 10 ms, each radio frame consisting of ten equally-sized subframes of length $T_{subframe}=1$ ms.

Messages transmitted over the radio link to wireless devices can be broadly classified as control messages or data messages. Control messages are used to facilitate the proper operation of the system as well as proper operation of each wireless device within the system. Control messages can include commands to control functions such as the transmitted power from a wireless device, signaling of RBs within which the data is to be received by the wireless device or transmitted from the wireless device and so on.

In Rel-8, the first one to four OFDM symbols, depending on the configuration, in a subframe are reserved to contain such control information, as illustrated in FIG. 2. Furthermore, in 3GPP release 11 (Rel-11), an enhanced downlink control channel (EPDCCH) was introduced, in which PRB pairs are reserved to exclusively contain EPDCCH transmissions, although excluding from the PRB pair the one to four first symbols that may contain control information to wireless devices of releases earlier than Rel-11.

Hence, the EPDCCH is frequency multiplexed with PDSCH transmissions, contrary to PDCCH which is time multiplexed with PDSCH transmissions. The resource allocation (RA) for PDSCH transmissions exists in several RA types, depending on the downlink control information (DCI) format. Some RA types have a minimum scheduling granularity of a resource block group (RBG). A RBG is a set of adjacent (in frequency) resource blocks and when scheduling the wireless device, the wireless device is allocated resources in terms of RBGs and not individual RBs.

When a wireless device is scheduled in the downlink from an EPDCCH, the wireless device may assume that the PRB pairs carrying the DL assignment are excluded from the resource allocation, i.e., rate matching applies. For example, if a wireless device is scheduled PDSCH in a certain RBG of size 3 adjacent PRB pairs, and one of these PRB pairs contain the DL assignment, the wireless device may assume that the PDSCH is only transmitted in the two remaining PRB pairs in this RBG. Note also that multiplexing of PDSCH and any EPDCCH transmission within a PRB pair is not supported in Rel-11.

The PDCCHs and EPDCCHs are transmitted over radio resources that are shared between several wireless devices. Each PDCCH consists of smaller parts, known as control channel elements (CCE), to enable link adaptation (by controlling the number of CCEs a PDCCH is utilizing). For PDCCH, a wireless device monitors 4 aggregation levels of CCEs, namely, 1, 2, 4, and 8, for wireless device-specific search space and 2 aggregation levels of CCEs, namely, 4 and 8, for common search space.

In 3GPP Technical Specification (TS) 36.213, Section 9.1.1, a search space $S_k^{(L)}$ at aggregation level $L \in \{1,2,4,8\}$ is defined by a set of PDCCH candidates. For each serving cell on which PDCCH is monitored, the CCEs corresponding to PDCCH candidate m of the search space $S_k^{(L)}$ are given by $$L\{(Y_k+m') \bmod \lfloor N_{CCE,k}/L \rfloor\}+i$$

where i=0, . . . , L−1. For the common search space m'=m. For the PDCCH wireless device specific search space, if the wireless device is configured with carrier indicator field then m'=m+$M^{(L)}$*$n_{CI}$, where $n_{CI}$ is the carrier indicator field value, otherwise m'=m, when m=0, . . . , $M^{(L)}$−1. $M^{(L)}$ is the number of PDCCH candidates to monitor in the given search space. Each CCE contains 36 quadrature phase-shift keying (QPSK) modulation symbols.

The value of $M^{(L)}$ is specified by Table 9.1.1-1 in 3GPP TS 36.213, as shown below in Table 1.

TABLE 1

| $M^{(L)}$ vs. Aggregation Level L for PDCCH | | | |
|---|---|---|---|
| | Search space $S_k^{(L)}$ | | Number of PDCCH |
| Type | Aggregation level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |

TABLE 1-continued

| $M^{(L)}$ vs. Aggregation Level L for PDCCH | | | |
|---|---|---|---|
| | Search space $S_k^{(L)}$ | | Number of PDCCH |
| Type | Aggregation level L | Size [in CCEs] | candidates $M^{(L)}$ |
| Common | 4 | 16 | 4 |
| | 8 | 16 | 2 |

PDCCH Processing

After channel coding, scrambling, modulation and interleaving of the control information, the modulated symbols are mapped to the resource elements in the control region. To multiplex multiple PDCCH onto the control region, control channel elements (CCE) has been defined, where each CCE maps to 36 resource elements. One PDCCH can, depending on the information payload size and the required level of channel coding protection, consist of 1, 2, 4 or 8 CCEs, and the number is denoted as the CCE aggregation level (AL). By choosing the aggregation level, link-adaptation of the PDCCH is obtained. In total, there are $N_{CCE}$ CCEs available for all the PDCCH to be transmitted in the subframe, and the number $N_{CCE}$ varies from subframe to subframe depending on the number of control symbols n and the number of antenna ports configured.

As $N_{CCE}$ varies from subframe to subframe, the wireless device needs to blindly determine the position and the number of CCEs used for its PDCCH which can be a computationally intensive decoding task. Therefore, some restrictions in the number of possible blind decoding that a wireless device may need to go through have been introduced. For instance, the CCEs are numbered, and CCE aggregation levels of size K can only start on CCE numbers evenly divisible by K, as illustrated in FIG. 3.

The set of candidate control channels formed by CCEs where a wireless device may need to blindly decode and search for a valid PDCCH are called search spaces. This is the set of CCEs on an aggregation level (AL) that a terminal should monitor for scheduling assignments or other control information, as illustrated in the example of FIG. 4. In FIG. 4, the search space that a certain wireless device is to monitor is indicated by one type of hatching while the common search space of $N_{CCE}$=15 CCEs is indicated by another type of hatching. In each subframe and on each AL, a wireless device will attempt to decode all the PDCCHs that can be formed from the CCEs in its search space. If the cycle redundancy check (CRC) checks (or in other words, is successful), then the content of the PDCCH is assumed to be valid for the terminal and it further processes the received information. Often two or more terminals have overlapping search spaces and the network has to select one of them for scheduling of the control channel. When this happens, the non-scheduled wireless device is "blocked". The search spaces vary pseudo-randomly from subframe to subframe to minimize this blocking probability.

A search space is further divided into a common and a wireless device specific part. In the common search space, the PDCCH containing information to all or a group of wireless devices is transmitted (paging, system information, etc.). If carrier aggregation is used, a wireless device may find the common search space present on the primary component carrier (PCC) only. The common search space may be restricted to aggregation levels 4 and 8 to give sufficient channel code protection for all terminals in the cell (since it is a broadcast channel, link adaptation might not be used). The first 8 and 4 CCEs of the PDCCH region corresponding to an AL 8 or 4 respectively belong to common search space. For efficient use of the CCEs in the system, the remaining search space is wireless device specific at each aggregation level.

A CCE consist of 36 QPSK modulated symbols that map to the 36 RE unique for this CCE. To maximize the diversity and interference randomization, interleaving of all the CCEs is used before a cell specific cyclic shift and mapping to REs. Note that in most cases some CCEs are empty due to the PDCCH location restriction to terminal search spaces and aggregation levels. The empty CCEs are included in the interleaving process and mapping to RE as any other PDCCH to maintain the search space structure. Empty CCE are set to zero power and this power can instead be used by non-empty CCEs to further enhance the PDCCH transmission.

EPDCCH Details

Similar as for PDCCH, the EPDCCH is transmitted over radio resources shared by multiple wireless devices and enhanced CCE (eCCE) is introduced as the equivalent to CCE for PDCCH. An eCCE has also a fixed number of RE but the number of RE available for EPDCCH mapping is generally fewer than this fixed number because many REs are occupied by other signals such as cell-specific reference signal (CRS) and Channel State Information Reference Signal (CSI-RS). Code chain rate matching is applied whenever a RE belonging to a eCCE contains other colliding signals such as the CRS, CSI-RS, legacy control region or in case of Time Division Duplex (TDD), the Guard Period (GP) and Uplink Pilot Time Slot (UpPTS) 3GPP Technical Specification (TS) 36.211.

In Rel-11, the EPDCCH supports wireless device specific search space whereas the common search space remains to be monitored in the PDCCH in the same subframe. In future 3GPP TS releases, the common search space may be introduced also for EPDCCH transmission.

It is specified that the wireless device monitors eCCE aggregation levels 1, 2, 4, 8, 16 and 32 with restrictions.

In distributed transmission, an EPDCCH is mapped to resource elements in up to D PRB pairs, where D=2, 4, or 8 (the value of D=16 is also being considered in 3GPP). In this manner, frequency diversity be achieved for the EPDCCH message.

In localized transmission, an EPDCCH is mapped to one PRB pair only, if the space allows (which is always possible for aggregation level one and two and for normal subframes and normal cycle prefix (CP) length also for level four). In case the aggregation level of the EPDCCH is too large, a second PRB pair is used as well, and so on, using more PRB pairs, until all eCCEs belonging to the EPDCCH has been mapped.

To facilitate the mapping of eCCEs to physical resources each PRB pair is divided into 16 enhanced resource element groups (eREGs) and each eCCE is split into 4 or 8 eREGs for normal and extended cyclic prefix, respectively. An EPDCCH is consequently mapped to a multiple of four or eight eREGs depending on the aggregation level.

These eREGs belonging to an ePDCCH reside in either a single PRB pair (as is typical for localized transmission) or a multiple of PRB pairs (as is typical for distributed transmission).

Assignment of EPDCCH Candidates

A wireless device is configured by higher layers with one or two EPDCCH-PRB-sets for EPDCCH monitoring, as described in 3GPP TS 36.213. Each EPDCCH-PRB-set consists of a set of ECCEs numbered from 0 to $N_{ECCE,p,k}-1$, where $N_{ECCE,p,k}$ is the number of ECCEs in EPDCCH-PRB-set p of subframe k.

The wireless device may monitor a set of EPDCCH candidates, that is, attempting to decode each of the possible EPDCCHs, at different aggregation levels, within the set. The set of EPDCCH candidates to monitor are defined in terms of EPDCCH wireless device-specific search spaces.

The ECCEs corresponding to an EPDCCH candidate m of the wireless device-specific search space are given by the following formulation:

$$L\left\{\left(Y_{p,k} + \left\lfloor \frac{m \cdot N_{ECCE,p,k}}{L \cdot M_p^{(L)}} \right\rfloor + b\right) \bmod \lfloor N_{ECCE,p,k} / L \rfloor\right\} + i$$

where $Y_{p,k}$ refers to wireless device Radio Network Temporary Identifier (RNTI) based offset, L is aggregation level, i=0, . . . , L−1, b is equal to the carrier indicator field value (if the wireless device is configured with it, otherwise b=0) m=0, 1, . . . , $M_p^{(L)}-1$, and $M_p^{(L)}$ is the number of EPDCCH candidates to monitor at aggregation level L in EPDCCH-PRB-set p.

sPDCCH for sTTI

In order to quickly schedule low latency data on the short TTIs, a new short PDCCH (sPDCCH) may be defined. Since the short TTI operation is desired to co-exist with legacy TTI operation, the sPDCCH may be placed in-band within PDSCH, still leaving resources for legacy data.

Legacy control channels PDCCH and EPDCCH use CRS and Demodulation Reference Signal (DMRS) demodulation, respectively. For operation in both these environments, an sPDCCH should support both CRS and DMRS, and to maintain efficiently, resources not used by sPDCCH should be used by sPDSCH (short PDSCH).

To facilitate the definition of the sPDCCH mapping to resource elements special entities are defined: sREG and sCCE. This follows the methodology used so far in the LTE specifications, i.e., 3GPP TSs, for defining PDCCH and ePDCCH, as described above. The definition of the same mapping can also be done without using these terms or by using equivalent terms.

sREG Configuration

The candidate lengths for sPDCCH in the time domain are 1 or 2 OFDM symbols for sTTI operation. The REs of a PRB in a given OFDM symbol of the sTTI can build one or more sREG. The number of REs in a sREG may also be variable in order to provide allocation flexibility and to support good frequency diversity.

The sREG configuration for sPDCCH is defined as the complete number of REs in a PRB within 1 OFDM symbol (i.e., 12 REs per sREG in 1 OFDM symbol). These sREG configurations are depicted in FIG. 10 where sREG configuration is based on 12 REs within 1 OFDM for 1 OFDM symbol sPDCCH (left), 2 OFDM symbol sPDCCH (center) and 2 OFDM symbol sPDCCH (right), considering 1 OFDM symbol sPDCCH, 2 OFDM symbol sPDCCH and 3 OFDM symbol sPDCCH. Each index, i.e. {0, 1, 2}, represents an sREG group.

sCCE Configuration

The number of sREG required to build up a sCCE for a given sPDCCH can vary as well as their placement scheme along the frequency resources used for sTTI operation. One option is to define a sCCE to be composed ideally by 36 REs like an eCCE or a CCE. For that, and based on FIG. 5, a sCCE is composed by three sREG, i.e., 1 sCCE=3 sREG.

For DMRS-based sPDCCH, a further option to consider in order to increase the number of REs available within 2 OFDM symbols SPDCCH is that an sCCE is defined to be composed by 48 REs instead of 36 REs, i.e. 1 sCCE=4 sREG. The 12 additional REs help compensating the DMRS overhead compared to CRS based sPDCCH.

In order to support good frequency diversity, or a more localized placement, localized and distributed placement schemes of sREG building up the same sCCE are defined:

Localized scheme: sREGs building the same sCCE can be localized in frequency domain to allow for a sPDCCH resource allocation confined in a limited frequency band. This facilitates the use of beamforming for DMRS based sPDCCH.

Distributed scheme: A distributed sREG location can be used to allow frequency diversity gains. In this case, multiple UEs may have the sREG of their sPDCCH mapped to the same PRB on different REs. Distributing over a wide frequency range also more easily makes the sPDCCH fit into one single OFDM symbol. For wireless devices with DMRS based demodulation, wireless device-specific beamforming is not recommended with distributed sCCE locations.

Configuration of PRBs that can be Used for sPDCCH

Up to two sets of PRBs that can be used for sPDCCH are configured per wireless device or user. Support for the configuration of several sets of PRBs used for sPDCCH may be recommended in order to configure one set of PRBs following the localized sPDCCH mapping and another set with the distributed mapping. The wireless device may monitor both sets and the network node could select the most favorable configuration/PRB set for a given sTTI and network node. The set of PRBs assigned for the sPDCCH, which includes PRBs (not necessarily consecutive) from the available sTTI band, may be configured via RRC signaling. However, the set may include a potential resource allocation refinement in the slow DCI transmitted in PDCCH, e.g., a reduced set of PRBs or a specific set in case that several sPDCCH sets were defined.

The set of PRBs assigned for the sPDCCH, which includes PRBs (not necessarily consecutive) from the available sTTI band, may be configured via RRC signaling. The set of PRBs are configured by the network node using a combinatorial index which allows full flexibility to allocate any PRB in the DL system bandwidth within the required set.

The configured PRB set consists then of a set of sCCEs numbered sequentially based on the total number of sCCEs forming the PRB set. Furthermore, since multiple sPDCCH candidates can be configured within the same sPDCCH PRB set, different wireless devices should be able to share the same PRB set. Hence, the network node obtains enough flexibility for multiplexing the sDCI of several wireless devices.

DCI Message with Indicator Bit

An indicator provides an indication whether to use unused sCCE resources within the sPDCCH PRB set for data.

The short DCI message, sDCI, sent from the network node to the wireless device contains an allocation bitmap for the data channel for short TTI, sPDSCH, similarly as done in DL resource allocation type 0. There, each bit in the bitmap refers to one RBG (resource block group). For a 10 MHz system, each RBG consists of 3 PRB, leading to 17 bits in the bitmap. In order to reduce the number of bits in the sDCI message, the bitmap is allowed to point to a sRBG, which is RBG for short TTI. To facilitate scheduling short TTI wireless devices with legacy wireless devices, the sRBG is allowed to be an integer multiple of the legacy RBG. The double size is implemented, i.e. 1 sRBG=2 RBG=6 PRB.

Each wireless device as described previously may be configured with up to two sets of sPDCCH resources. These consist of sets of sCCEs, i.e. PRBs, that can potentially contain sDCI messages.

When the wireless device reads its decoded sDCI, the wireless device looks at the bitmap pointing to sRBG indices. The wireless device then determines which PRBs correspond to the sRBG indices assigned for sPDSCH transmission. The PRBs not overlapping with the sPDCCH resources from where the wireless device decodes its sDCI are then used for sPDSCH data to the wireless device.

The PRBs within the assigned sRBG indices that are overlapping with the resources that were configured for sPDCCH as part of a sPDCCH RB set but were not used for transmitting the sDCI are handled in a different way. Now, an indicator bit is introduced to the sDCI message. The values are:

0: Do not use any configured sPDCCH resources, i.e. sCCE resources, for sPDSCH. None of the resources that are included within the current wireless device's sPDCCH PRB set, are used by this wireless device.

1: Use configured sPDCCH resources after the wireless device's sDCI for sPDSCH, i.e., unused sCCE resources. The wireless device knows the sCCE resources location of the sPDCCH PRB set and knows which resources after its present sDCI are used for data transmission targeted to this wireless device.

With this interpretation of a "1", if many wireless devices share the same configured sPDCCH resources, only one wireless device can be given a "1", since only one wireless device can have its sDCI placed last. For that, the sDCI placement for all wireless devices sharing the same sPDCCH PRB set needs to be configured consecutively.

Depending on how the sPDCCH PRB set is configured, the frequency placement of the sPDSCH data will differ. For instance, if the sPDCCH PRB set refers to a distributed set, then the sPDSCH data will also be distributed over many PRBs. A single wireless device can have resources allocated both from the indicator bit and the sRBG bitmap.

SUMMARY

Some embodiments advantageously provide a method and system for flexible resource allocation of short Transmission Time Interval (TTI).

Each wireless device is configured with (at least) one sPDCCH PRB set containing the location of sPDCCH candidates where to search for sDCI. The same sPDCCH PRB set can be shared between different wireless devices.

In each sDCI, the wireless device gets a bitmap indicating sRBG (which is a multiple of the legacy RBG) for data transmission.

To help ensure co-existence between wireless devices, an extra bit field with one bit or more is added in the sDCI message. Each bit in the bit field represents one or more sCCE indices from the configured sPDCCH PRB set. In one or more embodiments, when indicated a "1" in a certain bit, this denotes that the wireless device is scheduled data on the PRB resources building those sCCE. One or more embodiments described in the disclosure provide the configuration where the sPDCCH for different wireless devices sharing the same sPDCCH PRB set can be spread out over the defined set. This includes when the assigned sDCI for the different wireless devices are not configured on consecutive sCCEs.

According to one aspect of the disclosure, a network node for short transmission time interval, sTTI, resource allocation in a communication network is provided. The network node includes processing circuitry configured to determine a downlink control information, DCI, message. The DCI message includes a bit field of at least two bits, wherein each bit corresponds to a group of at least one short Control Channel Element, sCCE, of a configured sPDCCH region. The processing circuitry is further configured to transmit the DCI message to a wireless device. The bit field indicates whether the group of at least one sCCE is used for data transmission to the wireless device.

According to one embodiment of this aspect, the data transmission is sPDSCH data transmission. According to one embodiment of this aspect, at least a portion of the configured sPDCCH region is used for sPDSCH data transmission. According to one embodiment of this aspect, each group of the at least one sCCE corresponds to a same quantity of sCCEs. According to one embodiment of this aspect, each bit corresponds to a respective group of non-overlapping sCCEs.

According to one embodiment of this aspect, the group of at least one sCCE corresponds to a sCCE for transmission of the DCI message and at least one sCCE for the data transmission. According to one embodiment of this aspect, each sCCE has a respective sCCE index, and a mapping of the at least two bits to sCCE indices is based on a number of bits and size of the configured sPDCCH region. According to one embodiment of this aspect, each sCCE has a respective sCCE index, and a mapping of the at least two bits to sCCE indices is based on a predefined mapping.

According to one embodiment of this aspect, a grouping of sCCEs is based on a location and aggregation level of a sPDCCH candidate associated with the DCI message. According to one embodiment of this aspect, the wireless device shares the sPDCCH region with a second wireless device. According to one embodiment of this aspect, an assignment of sPDCCH candidates for each wireless device is spread out over the sPDCCH region.

According to another aspect of the disclosure, a method for a network node for short transmission time interval, sTTI, resource allocation in a communication network is provided. A downlink control information, DCI, message is determined. The DCI message includes a bit field of at least two bits where each bit corresponds to a group of at least one short Control Channel Element, sCCE, of a configured short Physical Downlink Control Channel, sPDCCH, region. The DCI message is transmitted to a wireless device. The bit field indicates whether the group of at least one sCCE is used for data transmission to the wireless device.

According to one embodiment of this aspect, the data transmission is sPDSCH data transmission. According to one embodiment of this aspect, at least a portion of the configured sPDCCH region is used for sPDSCH data transmission. According to one embodiment of this aspect, each group of the at least one sCCE corresponds to a same quantity of sCCEs. According to one embodiment of this aspect, each bit corresponds to a respective group of non-overlapping sCCEs.

According to one embodiment of this aspect, the group of at least one sCCE corresponds to a sCCE for transmission of the DCI message and at least one sCCE for the data transmission. According to one embodiment of this aspect, each sCCE has a respective sCCE index, and a mapping of the at least two bits to sCCE indices is based on a number of bits and size of the configured sPDCCH region. According to one embodiment of this aspect, each sCCE has a respective sCCE index, and a mapping of the at least two bits to sCCE indices is based on a predefined mapping.

According to one embodiment of this aspect, a grouping of sCCEs is based on a location and aggregation level of a sPDCCH candidate associated with the DCI message. According to one embodiment of this aspect, the wireless device shares the sPDCCH region with a second wireless device. According to one embodiment of this aspect, an assignment of sPDCCH candidates for each wireless device is spread out over the sPDCCH region.

According to another aspect of the disclosure, a wireless device for short transmission time interval, sTTI, resource allocation in a communication network is provided. The wireless device 14 includes processing circuitry configured to receive a downlink control information, DCI, message where the DC message includes a bit field of at least two bits. Each bit corresponds to a group of at least one short Control Channel Element, sCCE, of a configured short Physical Downlink Control Channel, sPDCCH, region. The processing circuitry is further configured to determine whether the group of at least one sCCE is used for data transmission based on the DCI message.

According to one embodiment of this aspect, the data transmission is sPDSCH data transmission. According to one embodiment of this aspect, at least a portion of the configured sPDCCH region is used for sPDSCH data transmission. According to one embodiment of this aspect, each group of the at least one sCCE corresponds to a same quantity of sCCEs. According to one embodiment of this aspect, each bit corresponds to a respective group of non-overlapping sCCEs.

According to one embodiment of this aspect, the group of at least one sCCE corresponds to a sCCE for transmission of the DCI message and at least one sCCE for the data transmission. According to one embodiment of this aspect, each sCCE has a respective sCCE index, and a mapping of the at least two bits to sCCE indices is based on a number of bits and size of the configured sPDCCH region. According to one embodiment of this aspect, each sCCE has a respective sCCE index, and a mapping of the at least two bits to sCCE indices is based on a predefined mapping.

According to one embodiment of this aspect, a grouping of sCCEs is based on a location and aggregation level of a sPDCCH candidate associated with the DCI message. According to one embodiment of this aspect, the wireless device shares the sPDCCH region with another wireless device. According to one embodiment of this aspect, an assignment of sPDCCH candidates for each wireless device is spread out over the sPDCCH region.

According to another aspect of the disclosure, a method for a wireless device for short transmission time interval, sTTI resource allocation in a communication network is provided. A downlink control information, DCI, message is received. The DCI message includes a bit field of at least two bits where each bit corresponds to a group of at least one short Control Channel Element, sCCE, of a configured short Physical Downlink Control Channel (sPDCCH) region. A determination is made whether the group of at least one sCCE is used for data transmission based on the DCI message.

According to one embodiment of this aspect, the data transmission is sPDSCH data transmission. According to one embodiment of this aspect, at least a portion of the configured sPDCCH region is used for sPDSCH data transmission. According to one embodiment of this aspect, each group of the at least one sCCE corresponds to a same quantity of sCCEs. According to one embodiment of this aspect, each bit corresponds to a respective group of non-overlapping sCCEs.

According to one embodiment of this aspect, the group of at least one sCCE corresponds to a sCCE for transmission of the DCI message and at least one sCCE for the data transmission. According to one embodiment of this aspect, each sCCE has a respective sCCE index, and a mapping of the at least two bits to sCCE indices is based on a number of bits and size of the configured sPDCCH region. According to one embodiment of this aspect, each sCCE has a respective sCCE index, and a mapping of the at least two bits to sCCE indices is based on a predefined mapping.

According to one embodiment of this aspect, a grouping of sCCEs is based on a location and aggregation level of a sPDCCH candidate associated with the DCI message. According to one embodiment of this aspect, the wireless device shares the sPDCCH region with another wireless device. According to one embodiment of this aspect, an assignment of sPDCCH candidates for each wireless device is spread out over the sPDCCH region.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 12 is a diagram of a sCCE-to-bit field indicator mapping for an sPDCCH PRB set size of six sCCEs and 3-bit indicator;

FIG. 19 is a diagram of a configured sPDCCH resources, with frequency distributed placement.

FIG. 25 is a diagram of an example scheduling bitmap for one UL user and two DL users where the 3-bit indicator is based on the definitions described in FIG. 24.

DETAILED DESCRIPTION

Figure 1:
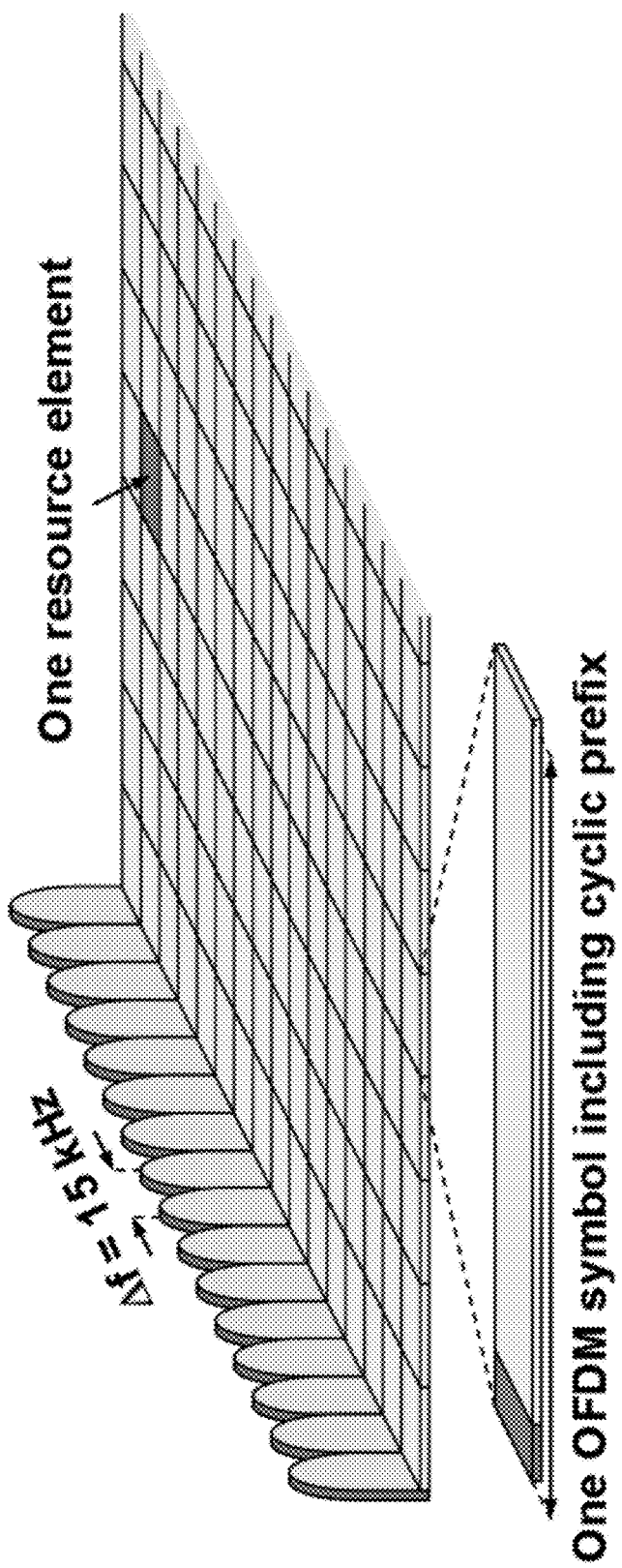
FIG. 1 is a diagram of an LTE downlink physical resource.
Figure 2:
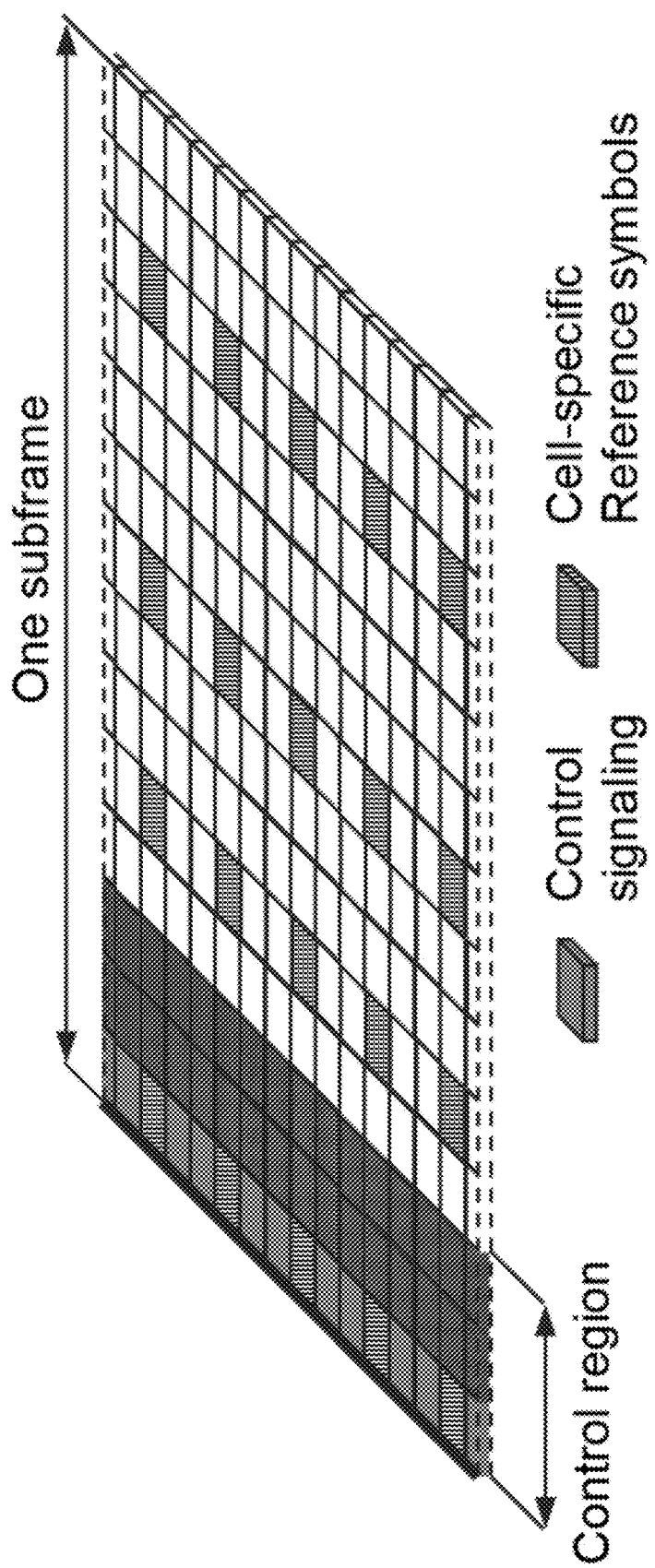
FIG. 2 is a diagram of a downlink subframe.
Figure 3:
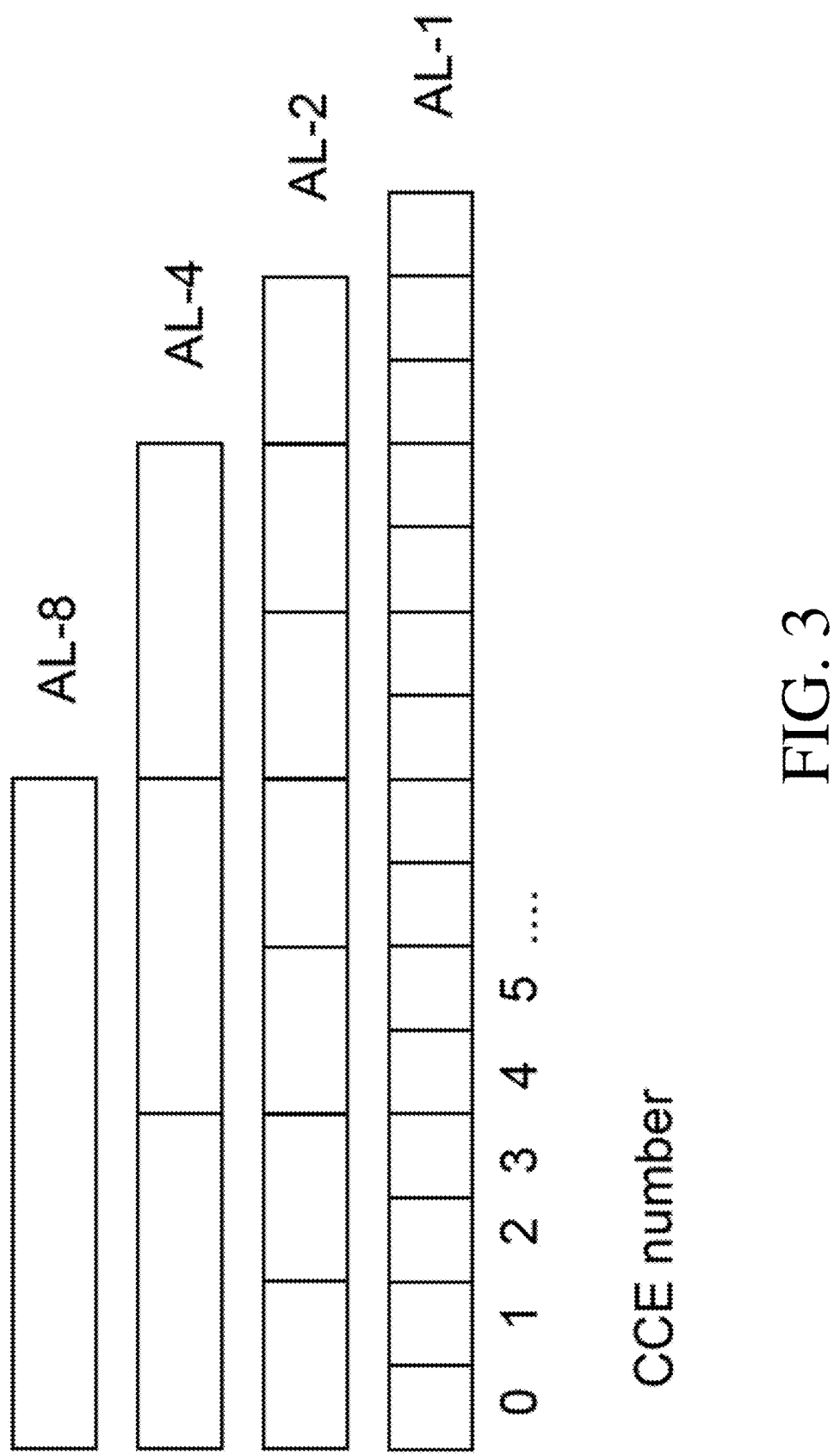
FIG. 3 is a diagram of CCE aggregation i levels (AL) 8, 4, 2 and 1.
Figure 4:
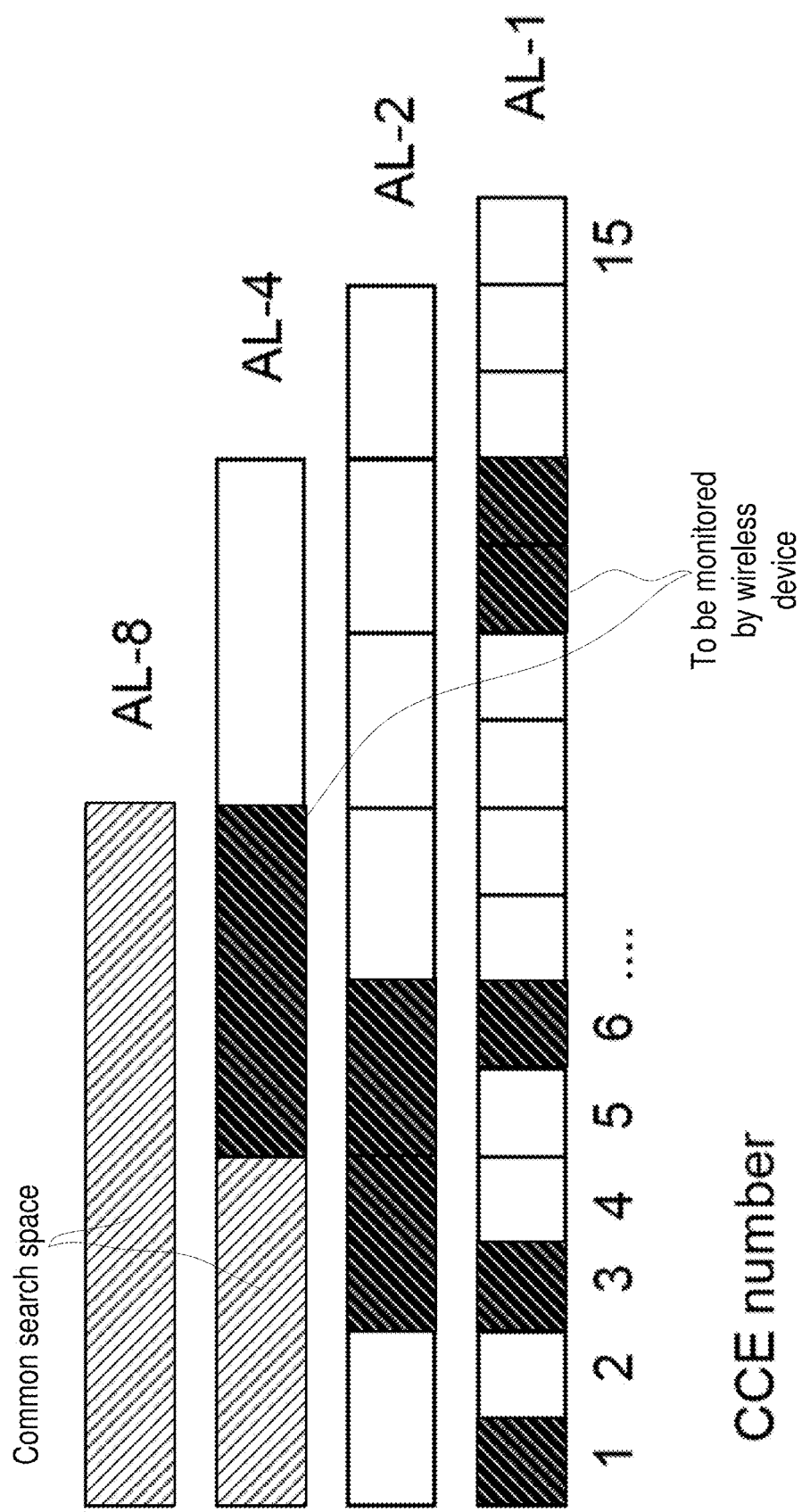
FIG. 4 is a diagram illustrating the search space that wireless device monitors and common search space.
Figure 5:
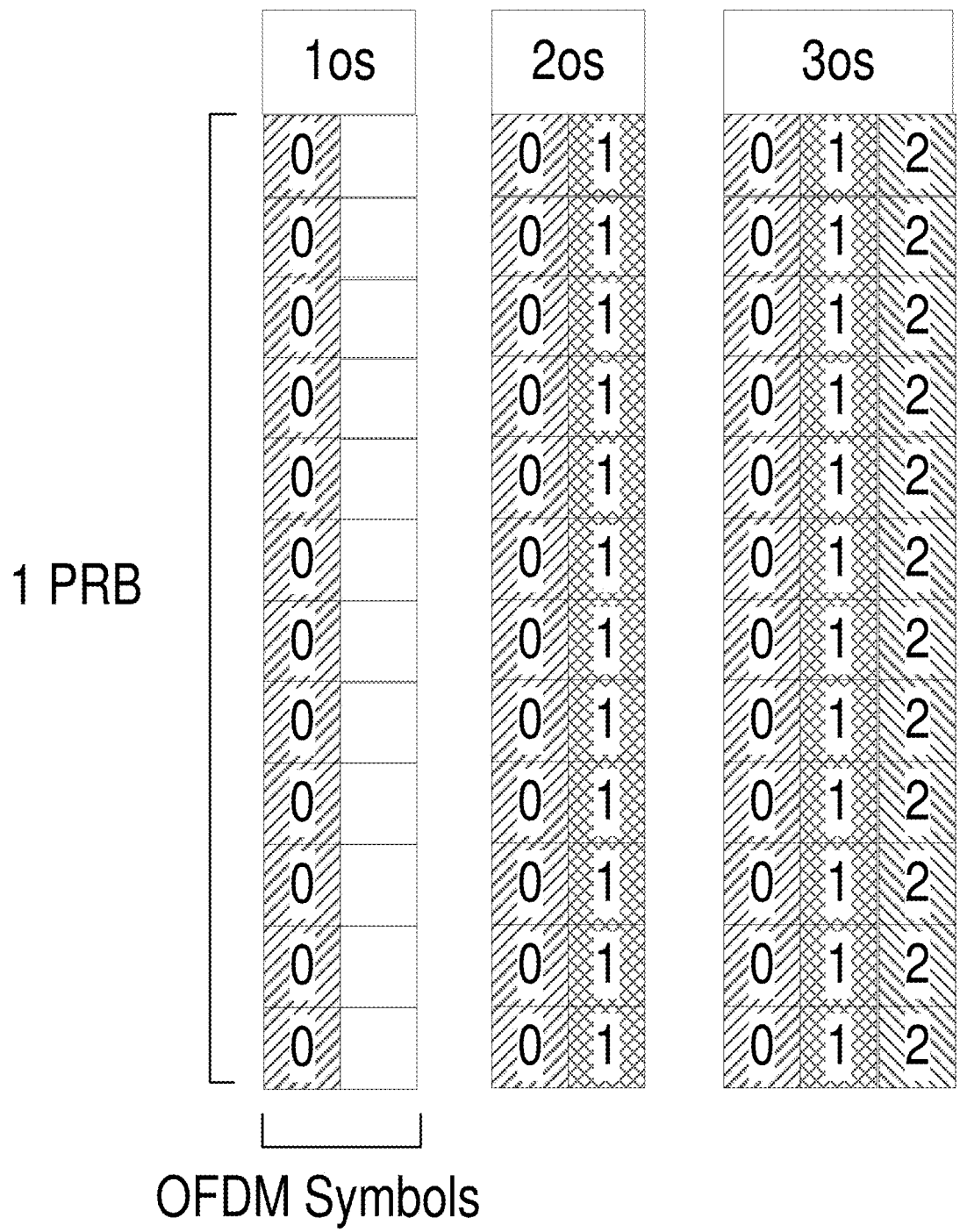
FIG. 5 is a diagram of sREG configuration based on twelve REs within one OFDM for one OFDM symbol sPDCCH (left), two OFDM symbol sPDCCH (center) and two OFDM symbol sPDCCH (right)

As described in in the introduction section, it was suggested to have one bit indicating whether unused sCCE resources within the sPDCCH region are used for sPDSCH by a wireless device. For that, if many wireless devices are sharing the same sPDCCH PRB set the sDCI placement for those wireless devices may be consecutively configured. Thereby, the network node's flexibility to define where to transmit the sDCI within the sPDCCH region becomes restricted.

This may result in that the network may also have the possibility to define sPDCCH candidates for different wireless devices to be more spread out over the defined sPDCCH region. Therefore, when all resources are not utilized for carrying the sDCI, the unused resources might not be placed consecutively from one sCCE index to the end. Hence, to be able to indicate exactly which sCCE resources may be used for data, more than one bit should be defined.

One possible solution includes the definition of more than one bit as described in unpublished U.S. Provisional Patent Application 62/455,050. However, this solution may require a complicated scheme that is dependent on the exact configuration of the decoding candidates. This solution may also require that different wireless devices use similar sets of decoding candidates. If the number of decoding candidates is minimized, different wireless devices may have candidates at non-overlapping positions, to prevent blocking. The previous solution in unpublished U.S. Provisional Patent Application 62/455,050 may thereby be improved by the teachings described in this disclosure.

The solution set out in unpublished U.S. Provisional Patent Application 62/455,050 may have some implementation challenges when applying techniques where each wireless device is assigned different mapping functions giving the decoding candidates individual locations, and furthermore also assigning each wireless device with individual bitmaps masking out only some active candidates. These techniques reduce the number of decoding attempts the wireless device has to perform, but at the same time may make the active search spaces very different between wireless devices.

With the teachings of the instant disclosure, it is possible to:

To have an efficient system, helping ensure the most resources possible to use for data (sPDSCH or PDSCH) if not used by control (sPDCCH).

Allow co-existence between wireless devices with distributed and users with localized sPDCCH placement.

Allow co-existence between CRS-sPDCCH and DMRS-sPDCCH.

Allow co-existence with legacy LTE, allocation type 0.

Have a low control channel overhead.

Be flexible in order to allow different wireless devices to have different monitored decoding candidates.

Assign unused consecutive or non-consecutive sPDCCH resources for data.

Throughout this disclosure, it is assumed that sPDCCH parameters have been pre-configured over higher layer signaling such as RRC for LTE or pre-defined, e.g. in the LTE specifications. Typical sPDCCH parameters are the number of time resources, e.g. OFDM symbols, sPDCCH PRB set(s) containing the wireless device's search space, aggregation levels and nominal number of candidates per aggregation level used for sPDCCH transmission (sDCI) to be monitored by each wireless device. As an example for the short TTI (sTTI) operation, the pre-configured or pre-defined number of OFDM symbols (OS) for sPDCCH is 1, 2 or 3 in the following description. Also, the aggregation levels (AL) can be assumed to be configured up to AL4 (i.e. AL 1, 2 and 4) and the sPDCCH PRB set sizes up to 8 sCCEs.

Before describing in detail exemplary embodiments, it is noted that the embodiments reside primarily in combinations of apparatus components and processing steps related to flexible resource allocation of short Transmission Time Interval (TTI). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 6:
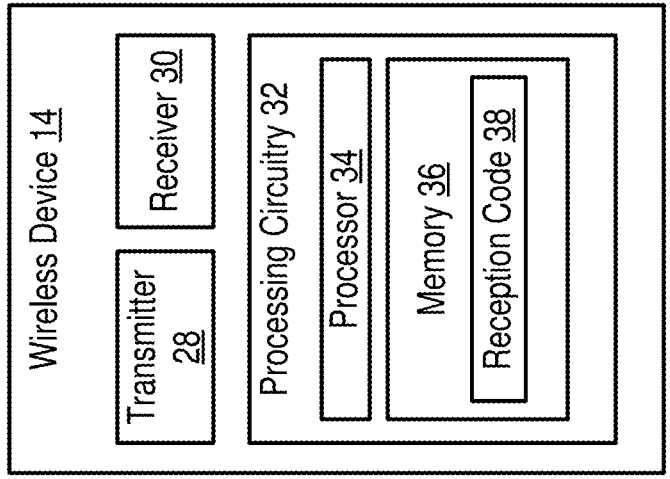
FIG. 6 is a block diagram of an example system for flexible resource allocation of short Transmission Time Intervals (TTI)
Figure 6:
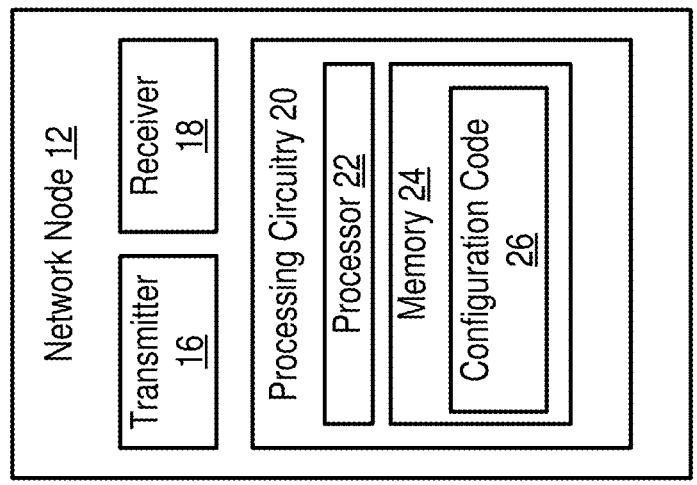

Referring now to drawing figures in which like reference designators refer to like elements there is shown in FIG. 6 is a block diagram of an example system for flexible resource allocation of short Transmission Time Interval (TTI) in accordance with the principles of the disclosure, where the system is designated generally as system "10". System 10 includes one or more one or more network nodes 12 and one or more wireless devices 14, in communication with each other via one or more communication networks, paths and/or links using one or more communication protocols such as LTE and/or New Radio (NR) based protocols.

Network node 12 includes transmitter 16 and receiver 18 for transmitting with wireless device 14, other network nodes 12 and/or other entities in system 10. In one or more embodiments, transmitter 16 and receiver 18 includes or is replaced by one or more communication interfaces.

Network node 12 includes processing circuitry 20. Processing circuitry 20 includes processor 22 and memory 24. In addition to a traditional processor and memory, processing circuitry 20 may comprise integrated circuitry for processing and/or control, e.g., one or more processors and/or processor cores and/or FPGAs (Field Programmable Gate Array) and/or ASICs (Application Specific Integrated Circuitry). Processor 22 may be configured to access (e.g., write to and/or reading from) memory 24, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by processor 22 and/or other data, e.g., data pertaining to communication, e.g., configuration and/or address data of nodes, etc.

Processing circuitry 20 may be configured to control any of the methods and/or processes described herein and/or to cause such methods, signaling and/or processes to be performed, e.g., by network node 12. Processor 22 corresponds to one or more processors 22 for performing network node 12 functions described herein. Network node 12 includes memory 24 that is configured to store data, programmatic software code and/or other information described herein. In one or more embodiments, memory 24 is configured to store configuration code 26. For example, configuration code 26 includes instructions that, when executed by processor 22, causes processor 22 to perform the processes describe herein with respect to network node 12.

The term "network node 12" used herein can be any kind of network node comprised in a radio network which may further comprise any of base station (BS), radio base station, base transceiver station (BTS), base station controller (BSC), radio network controller (RNC), gNodeB, evolved Node B (eNB or eNodeB), Node B, gNB, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS) etc.

It is contemplated that the functions of network node 12 and wireless device 14 described herein are not limited to performance by a single physical device and, in fact, can be distributed among several physical devices locally or across a network cloud such as a backhaul network and/or the Internet.

Wireless device 14 includes transmitter 28 and receiver 30 for communicating with network node 12, other wireless devices 14 and/or other entities in system 10. In one or more embodiments, transmitter 28 and receiver 30 include or are replaced by one or more communication interfaces.

Wireless device 14 includes processing circuitry 32. Processing circuitry 32 includes processor 34 and memory 36. In addition to a traditional processor and memory, processing circuitry 32 may comprise integrated circuitry for processing and/or control, e.g., one or more processors and/or processor cores and/or FPGAs (Field Programmable Gate Array) and/or ASICs (Application Specific Integrated Circuitry). Processor 34 may be configured to access (e.g., write to and/or reading from) memory 36, which may include any kind of volatile and/or nonvolatile memory, e.g., cache and/or buffer memory and/or RAM (Random Access Memory) and/or ROM (Read-Only Memory) and/or optical memory and/or EPROM (Erasable Programmable Read- Only Memory). Such memory 36 may be configured to store code executable by processor 34 and/or other data, e.g., data pertaining to communication, e.g., configuration and/or address data of nodes, etc.

Processing circuitry 32 may be configured to control any of the methods and/or processes described herein and/or to cause such methods, signaling and/or processes to be performed, e.g., by wireless device 14. Processor 34 corresponds to one or more processors 34 for performing wireless device 14 functions described herein. Wireless device 14 includes memory 36 that is configured to store data, programmatic software code and/or other information described herein. In one or more embodiments, memory 36 is configured to store reception code 38. For example, reception code 38 includes instructions that, when executed by processor 34, causes processor 34 to perform the processes describe herein with respect to wireless device 14.

Wireless device 14 may be a radio communication device, wireless device endpoint, mobile endpoint, device endpoint, sensor device, target device, device-to-device wireless device, user equipment (UE), machine type wireless device or wireless device capable of machine to machine communication, a sensor equipped with wireless device, tablet, mobile terminal, mobile telephone, laptop, computer, appliance, automobile, smart phone, laptop embedded equipped (LEE), laptop mounted equipment (LME), USB dongle and customer premises equipment (CPE), among other devices that can communicate radio or wireless signals as are known in the art. Wireless device 14 and UE 14 are used interchangeably in the disclosure.

Figure 7:
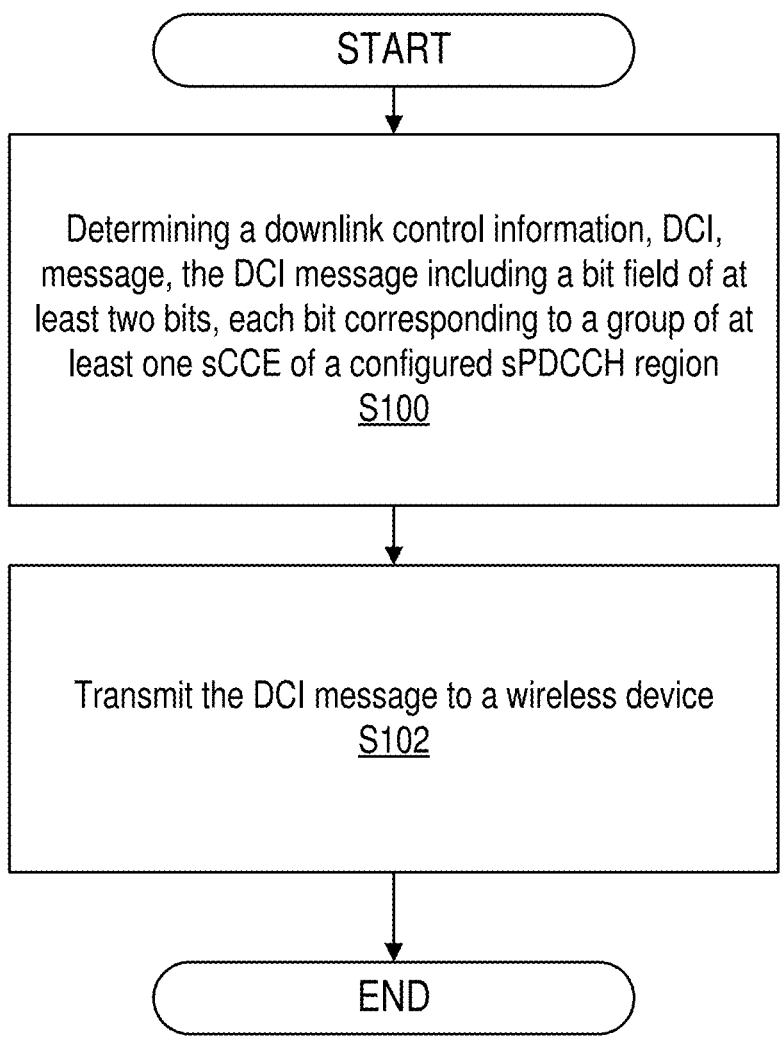
FIG. 7 is a flow diagram of an example configuration process of configuration code 26 in accordance with the principles of the disclosure.
Figure 8:
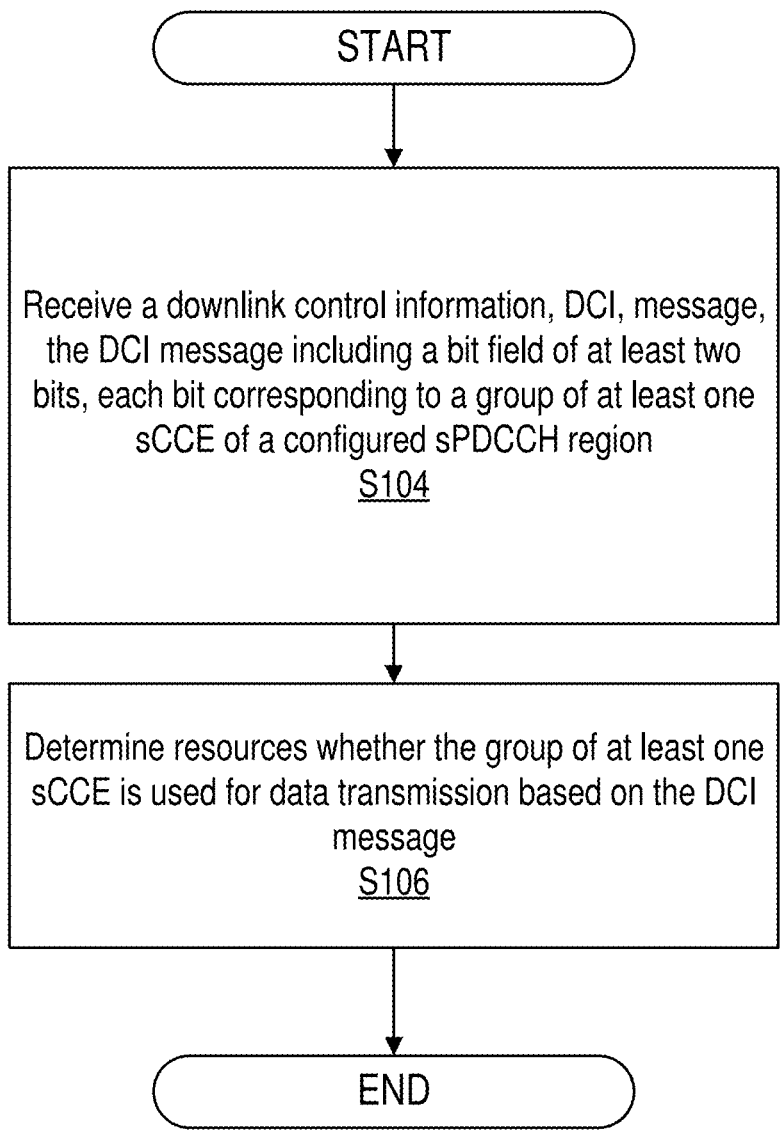
FIG. 8 is a flow diagram of an example reception process of reception code 38 in accordance with the principles of the disclosure.

FIG. 7 is a flow diagram of an example assignment process of assignment code 26 in accordance with the principles of the disclosure. Processing circuitry 20 is configured to determine a downlink control information, DCI, message, the DCI message including a bit field of at least two bits (Block S100). Each bit corresponds to a group of at least one sCCE of a configured sPDCCH region. Processing circuitry 20 is configured to communicate the DCI message to wireless device 14. The bit field indicates whether the group of at least one sCCE is used for data transmission to wireless device 14.

In one or more embodiments, network node 12 schedules DL transmission, at least in part by sending DCI message. Processing circuitry 20 is configured to configure a DCI message to provide an indication of resources used by the downlink data channel, and provide a bit field of more than one bit, wherein each bit represents a group of one or more sCCE of a configured sPDCCH region, and where the bit indicates whether these sCCE are:
 i. not used for data transmission to UE receiving DCI message
 ii. used for data transmission to UE receiving DCI message In one or more embodiments, the number of bits in the bit field depends on the size of the configured sPDCCH region. In one or more embodiments, the number of bits in the bit field depends on the bandwidth. In one or more embodiments, the number of bits in the bit field depends on wireless device 14's sPDCCH aggregation level. In one or more embodiments, the number of bits in the bit field depends on the number of users sharing the same sPDCCH region.

In one or more embodiments, the number of bits in the bit field is transmitted by the network via higher layer signaling. In one or more embodiments, the mapping from bits to sCCE indices (i.e., how the groups of sCCEs are defined) is calculated dependent on number of bits and size of the sPDCCH region. In one or more embodiments, the mapping from bits to sCCE indices is configured by network node 12 based on a pre-defined mapping in specification. In one or more embodiments, the mapping from bits to sCCE indices is dynamically configured by network node 12 based on the configured location of the sPDCCH candidates for the users sharing the same sPDCCH region.

In one or more embodiments, the mapping from bits to sCCE indices is transmitted by network node 12 via higher layer signaling. In one or more embodiments, the grouping of sCCEs depends on the location and aggregation level of the sPDCCH candidate used to send the DCI message region. In one or more embodiments, different wireless devices 14 share the same sPDCCH region (same sPDCCH PRB set).

In one or more embodiments, the assignment of sPDCCH candidates for each wireless device 14 can be spread out over the sPDCCH region. In one or more embodiments, network node 12 dynamically sends configuration of control resources (reconfiguration of resources within the sPDCCH region).

Figure 14:
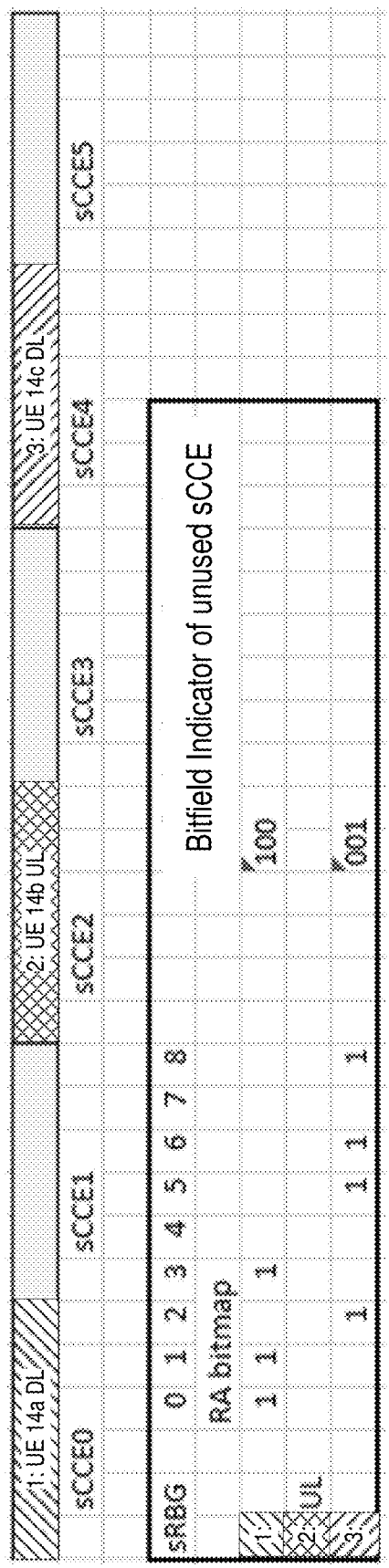
FIG. 14 is an example of three wireless devices sharing the same sPDCCH PRB set.

FIG. 14 is a flow diagram of an example reception process of reception code 38 in accordance with the principles of the disclosure. Processing circuitry 32 is configured to receive a downlink control information, DCI, message (Block S104). The DCI message includes a bit field of at least two bits. Each bit corresponds to a group of at least one sCCE of a configured sPDCCH region. Processing circuitry 32 is configured to determine resources whether the group of at least one sCCE is used for data transmission based on the DCI message (Block S106).

Flexible Resource Allocation of Unused sPDCCH Resources for sTTI Operation

For operation of short TTI and specially for the case of 2 Orthogonal Frequency Division Multiplexing (OFDM) symbol (os) TTI length where the amount of resources can be limited, unused sPDCCH resources may be utilized, i.e., unused sCCE resources within the configured sPDCCH PRB set(s), for data (sPDSCH).

As described in the background section of this disclosure, in each wireless device 14's sDCI, the wireless device 14 gets a resource allocation bitmap indicating sRBG (which is a multiple of the legacy RBG) for data transmission. Besides, an extra bit field indicator with more than one bit may be required for the wireless device 14's sDCI to allocate unused sPDCCH resources for data transmission. This additional bit field indicator may be needed to ensure co-existence between wireless devices 14 configured with the same sPDCCH PRB set.

Hence, in one or more embodiments, an extra bit field indicator is defined, so that, each bit in the bit field represents one or more sCCE indices from the configured sPDCCH PRB set. When indicated a "1" in a certain bit, this denotes that wireless device 14 is scheduled data on the PRB resources building those sCCE. These one or more embodiments, include the configuration where the sPDCCH for different wireless devices 14 sharing the same sPDCCH PRB set can be spread out over the defined set. This includes, for example, when the assigned sDCI for the different users are not configured on consecutive sCCEs. These one or more embodiments are further described below.

The number of bits in the bit field indicator depends on the sPDCCH PRB set size, i.e., the number of sCCEs present in the PRB set. In other words, the number of bits of this bit field indicator may depend on the system bandwidth as the sPDCCH PRB set size to be configured is likely to depend on the available number of PRBs in system 10. Likewise, the number of bits in the bit field depends on wireless device 14's sPDCCH aggregation level, which can lead to a limited number of potential unused sCCEs. Nevertheless, considering that the total number of bits included in the sDCI is targeted to be limited, the number of bits in this extra bit field indicator may need to be limited as well. The defined number of bits in the bit field indicator may be signaled by network node 12 to wireless device 14 via RRC. The defined number of bits in the bit field indicator may also be implicitly defined by other system parameters, like system bandwidth, or other configured RRC parameters like sPDCCH PRB set.

For the mapping description below up to three bits are defined for this extra bitfield. However, this definition can be similarly extended to a higher number of bits.

In order to describe the mapping definition of this extra bit field indicator, three different sPDCCH PRB set sizes containing different number of sCCEs are considered: 4 sCCEs, 6 sCCEs and 8 sCCEs, and three aggregation levels (ALs): 1, 2 and 4. Likewise, same mapping definition can be taken for different PRB set sizes and ALs.

sCCE to Bit Field Indicator Mapping

The sCCE-to-bit field indicator mapping is configured by network node 12 and known by wireless device 14s. The mapping can be pre-configured over higher layer signaling such as RRC for LTE or pre-defined, e.g. in the LTE specifications. The mapping definition is based on wireless device 14's sPDCCH location and its sPDCCH aggregation level. Thereby, each bit, e.g., from ab for the case of 2-bit indicator or from abc for the case of 3-bit indicator, comprises a group of sCCEs within the sPDCCH PRB set, as further described below.

In one embodiment, the mapping function forms sCCE groups within the unused sCCEs of the configured sPDCCH PRB set. This mapping may thereby be different depending on the aggregation level and location of the found sPDCCH. The number of sCCE groups are then defined as follows:
1. For 2-bit indicator (ab), the unused sCCEs are split into two groups.
2. For 3-bit indicator (abc), the unused sCCEs are split into three groups.
3. One can generalize and say that for an x-bit indicator (abc), the unused sCCEs are split into x groups.

As an alternative, the mapping definition can further imply forming sCCEs groups within the configured sPDCCH PRB set according to the number of bits configured for the bit field indicator. Considering up to 3-bit indicator, the sCCE groups are split such that the wireless device 14's sPDCCH is fully included in one of the groups. Thus, if one of the bits included in the wireless device 14's sPDCCH is set to 1, wireless device 14 already knows which remaining sCCE(s) are assigned for data. The number of sCCE groups are then defined as follows:
1. For 2-bit indicator (ab), the sCCEs are split into two groups.
2. For 3-bit indicator (abc), the sCCEs are split into three groups.
3. One can generalize and say that for an x-bit indicator (abc), the sCCEs are split into x groups.

To let each bit in the bit vector be of similar importance, certain mapping may be allowed if and only if Condition 1 holds:

{max number of unused sCCEs in a group}<={min number of unused sCCEs in a group}+1    Condition 1:

2-Bit Indicator (Ab) Mapping

Figure 9:
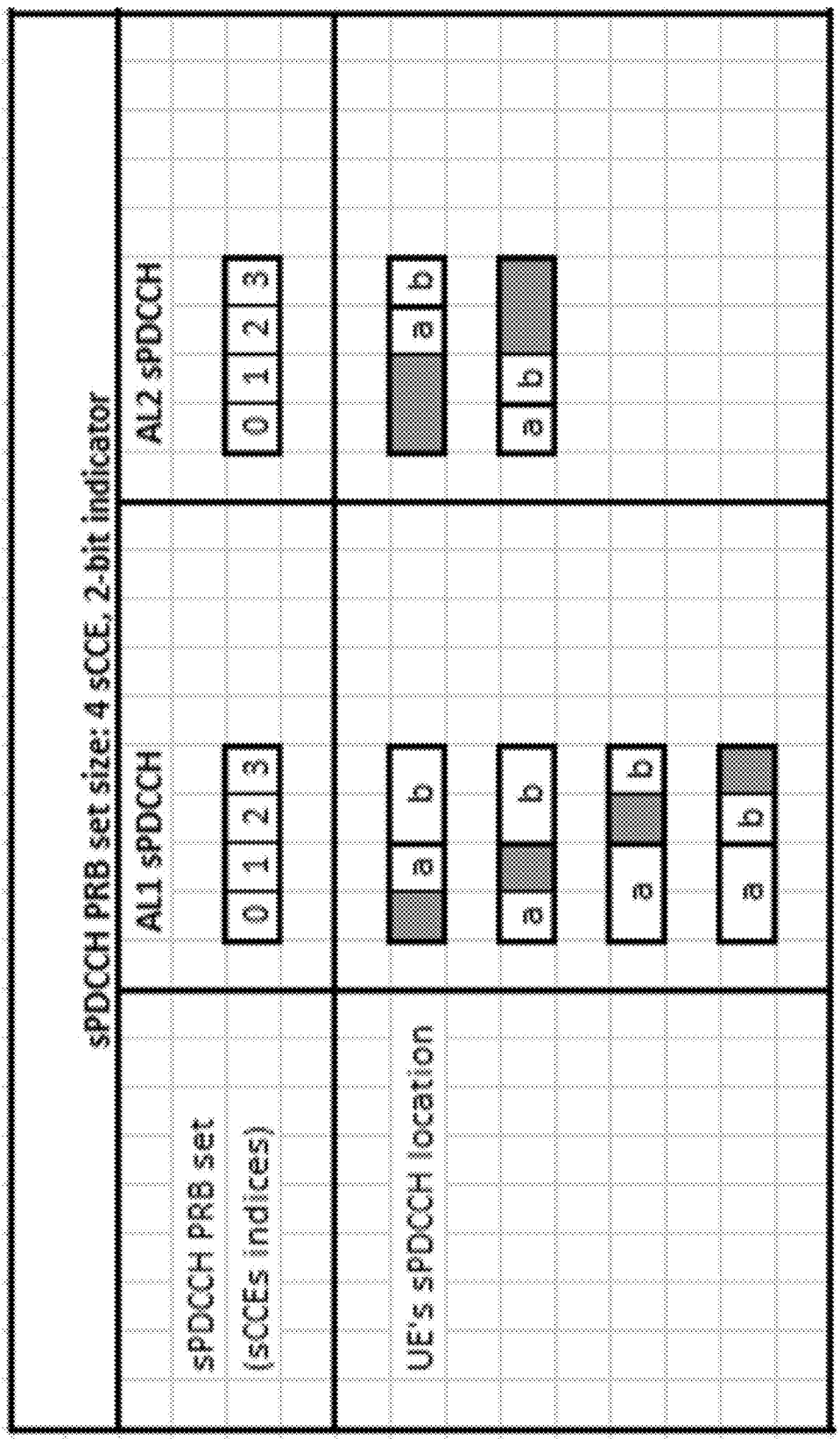
FIG. 9 is a diagram of sCCE-to-bit field indicator mapping for an sPDCCH PRB set size of 4 sCCEs and 2-bit indicator.

Considering the case of 2-bit indicator (ab) and an sPDCCH PRB set sizes of 4 sCCEs with up to AL2 for sPDCCH, the mapping is defined as depicted in FIG. 9. As shown, the sCCE groups are split between sCCE indices 1|2 for AL1, wherein bit a refers to sCCE indices 0, 1, and bit b refers to sCCE indices 2, 3. For example, bit a corresponds to a group of sCCEs corresponding to sCCE indices 0, 1 while bit b corresponds to a different group of sCCEs corresponding to sCCE indices 2, 3. For AL2, depending on the wireless device 14's sPDCCH location, the groups are split either between 0|1 or 2|3. Thus, if AL2 wireless device 14's sPDCCH is located in sCCE #0,1 then bit a refers to sCCE indices 0, 1, 2, and bit b refers to sCCE index 3. On the other hand, if AL2 wireless device 14's sPDCCH is located in sCCE #2,3 then bit a refers to sCCE index 0, and bit b refers to sCCE indices 1, 2, 3.

For an sPDCCH PRB set size of 4 sCCEs and AL4, there may be no need to transmit this extra bit field indicator as no unused sCCE are left. Likewise, it can be defined that no more than 2-bit indicator may be required for sPDCCH PRB set size of up to 4 sCCEs.

For instance, if wireless device 14 is assigned with an AL1 sPDCCH located in sCCE index 1, the bit a refers to sCCE indices 0, and the bit b refers to sCCE indices 2, 3. For simplicity, the sPDCCH PRB set can be then seen as a*bb. Therefore, if wireless device 14 is signaled with a=1 and b=0, this indicates that the sCCE index 0 has been allocated for data.

The split between groups for sPDCCH PRB set size 4 can be done as:
Put border between 1 and 2 if Condition 1 allows (always OK for AL1 as seen in FIG. 9);
otherwise between 2 and 3 if allowed;
otherwise between 0 and 1.

Figure 10:
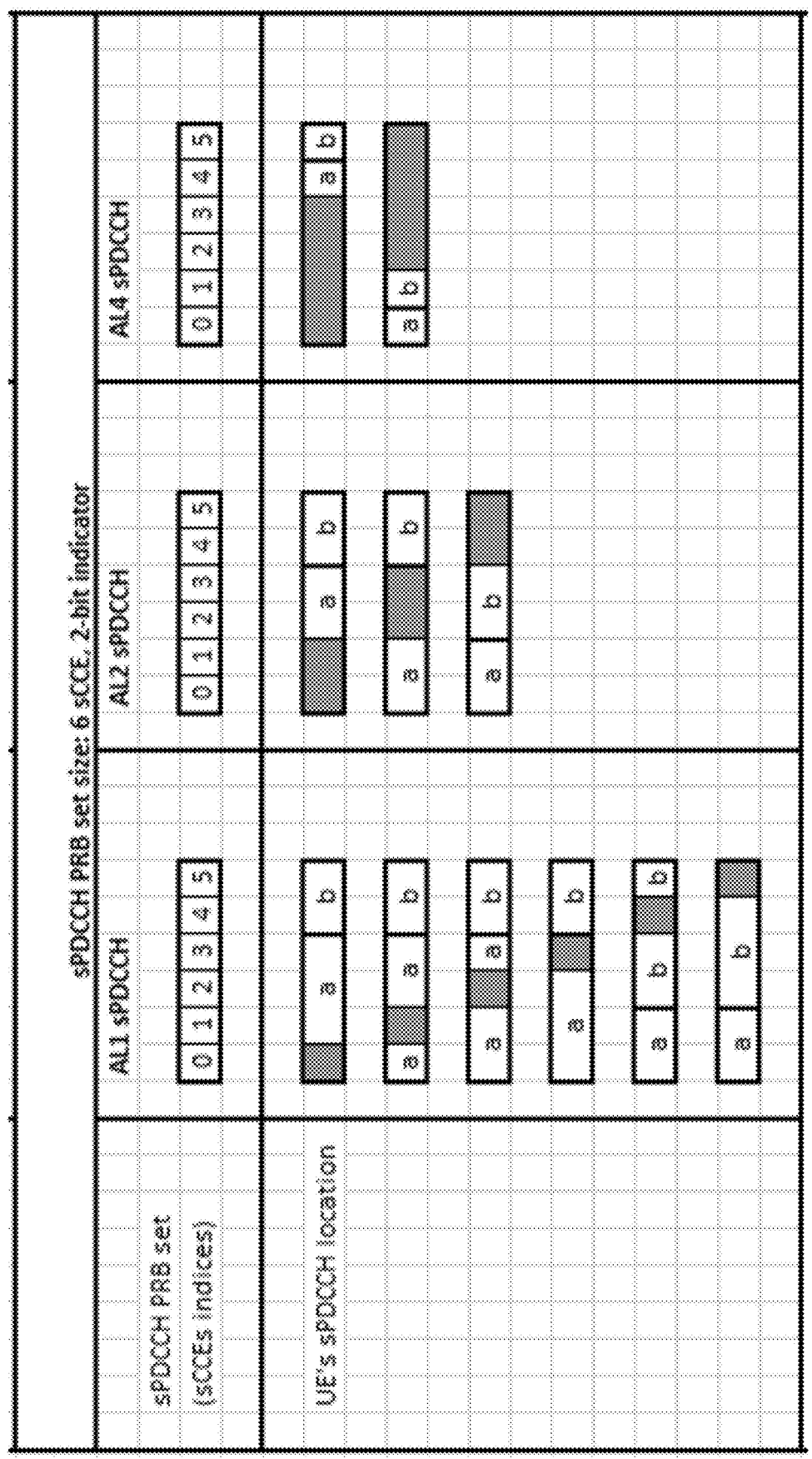
FIG. 10 is a diagram of sCCE-to-bit field indicator mapping for an sPDCCH PRB set size of size sCCEs and 2-bit indicator.
Figure 11:
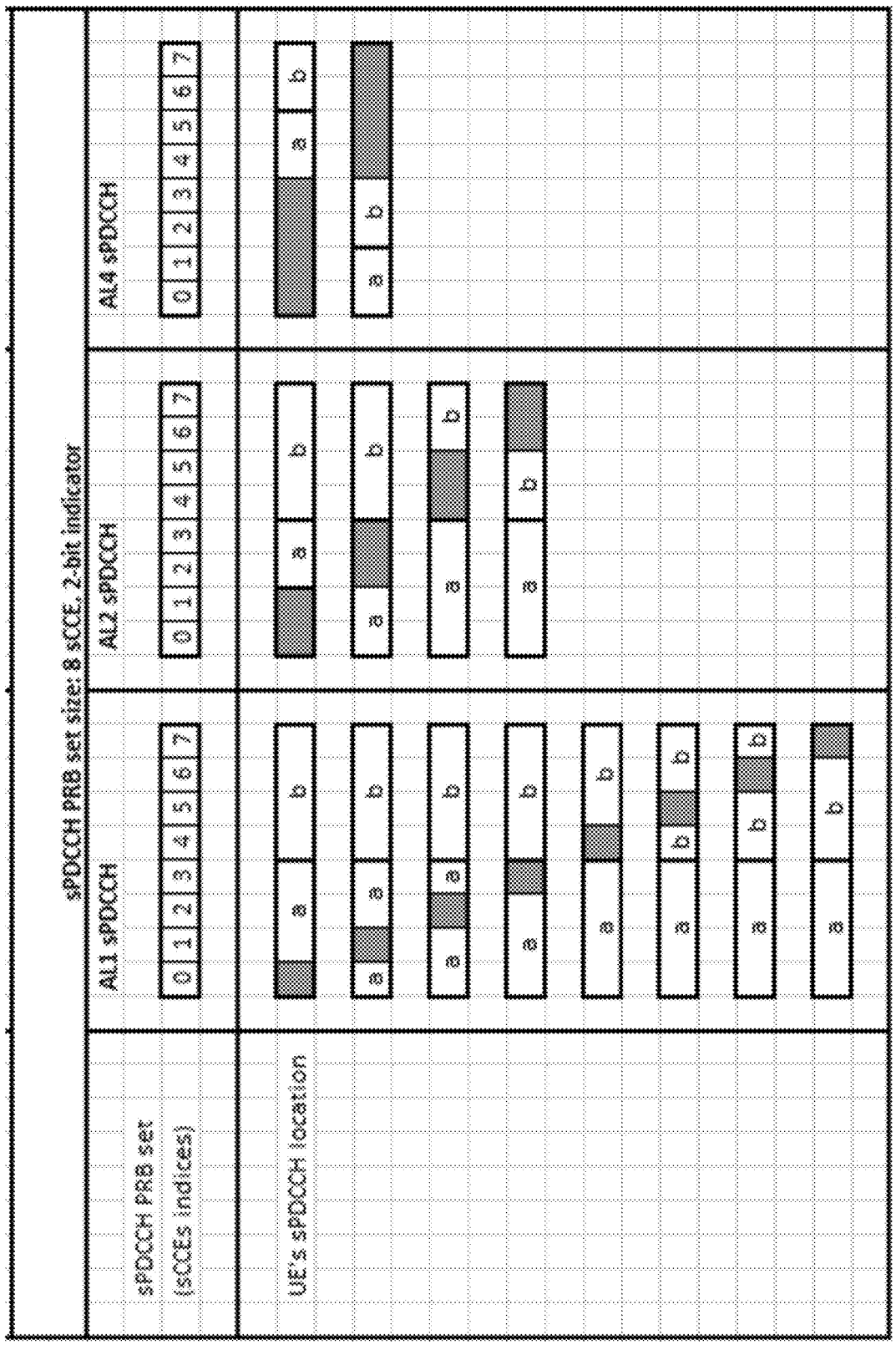
FIG. 11 is a diagram of a sCCE-to-bit field indicator mapping for an sPDCCH PRB set size of eight sCCEs and 2-bit indicator.

Likewise, the 2-bit indicator mapping for sPDCCH PRB set sizes 6 sCCEs and 8 sCCEs with up to AL4 for sPDCCH are defined as depicted in FIGS. 10-11, respectively.

For 6 sCCE mappings in FIG. 10, the border can be placed as:
Put border between 3 and 4 if allowed;
otherwise between 1 and 2 if allowed;
otherwise between 0 and 1 if allowed;
otherwise between 4 and 5.

For 8 sCCE mappings in FIG. 11, the border can be placed as:
Put border between 3 and 4 if allowed (always OK for AL1 and AL2)
otherwise between 5 and 6 if allowed;
otherwise between 1 and 2.

These are just examples of how to place borders. Other ways are possible. In general, the above condition may be fulfilled, and borders may be favored at the higher aggregation level borders (e.g., between 3 and 4 where AL4 has a border between the candidates).

In one embodiment, the algorithm defined by the following pseudo-code can be used, here shown for up to AL4, and three bits, i.e., two borders between groups:
Create ordered list of borders as [AL4 borders; AL2 borders; AL1 borders]
Loop first border position over list (i.e., starting with higher aggregation levels):
Loop second border position over list:
If mapping is allowed according to condition 1:
Use grouping according to chosen borders;
Finished grouping.

This algorithm can be expanded for different aggregation levels, e.g., starting the list with AL8 borders, or having more than two loops over border positions if having more than three bits (or only one loop for two bits).

3-Bit Indicator (Abc) Mapping

Figure 12:
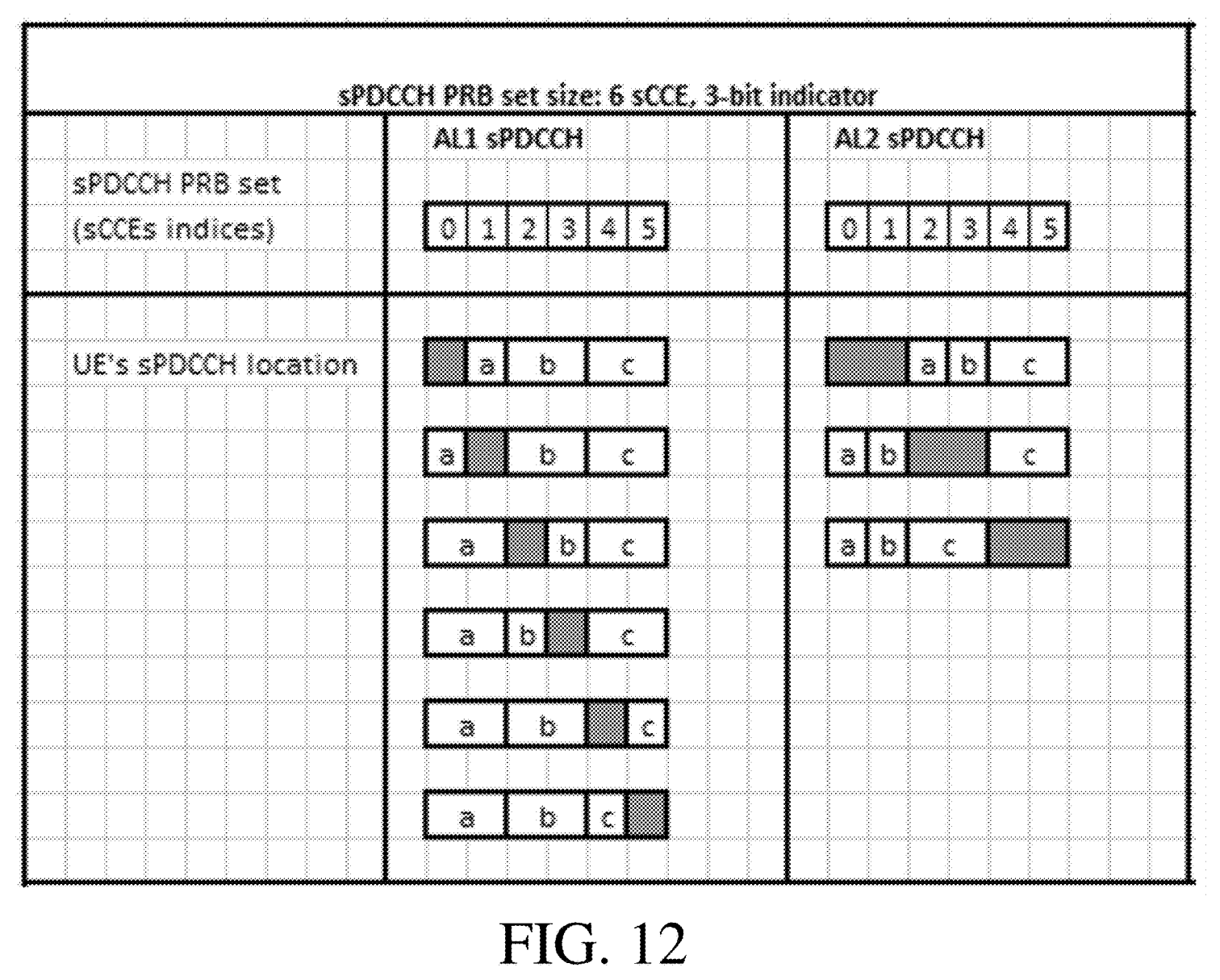
Figure 13:
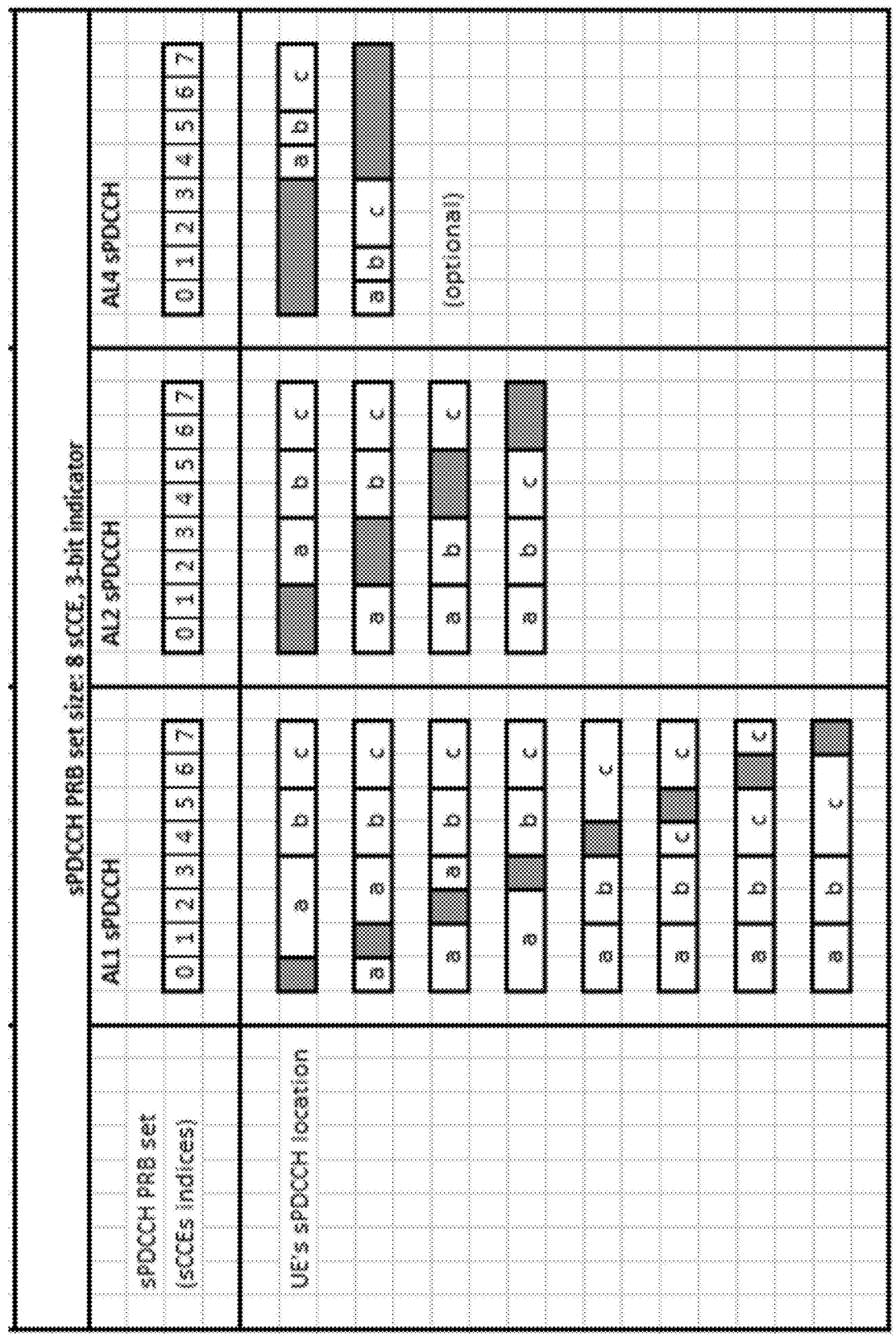
FIG. 13 is a diagram of a sCCE-to-bit field indicator mapping for an sPDCCH PRB set size of 8 sCCEs and 3-bit indicator.

As was defined above for 2-bit indicator mapping, the 3-bit indicator mapping is likewise defined. FIGS. 12-13 depict the 3-bit mapping definition for sPDCCH PRB set sizes 6 sCCEs and 8 sCCEs with up to AL4 for sPDCCH, respectively. As described above, sPDCCH PRB set sizes of up to 4 sCCEs may not require more than 2-bit indicator.

As shown in the case of a 6 sCCEs PRB set size, for AL4 UE's sPDCCH a 3-bit indicator might not be needed as there are only two potential unused sCCE left. So, it can be already signaled with 2-bit indicator. Furthermore, as shown in the case of 8 sCCEs PRB set size, the AL4 is marked as optional. This is taking into account that for the case of AL1 and AL2 each bit comprises two or more sCCEs. Therefore, network node 12 could decide to signal for the AL4 case the remaining potential unused sCCEs as defined for the 2-bit indicator. In case a fixed number of bits is defined for the DCI message, the extra bit may be sent but ignored since it has no meaning.

Dynamic sCCE to Bit Field Indicator Mapping

Multiple wireless device 14 can be configured to share the same sPDCCH region, i.e., same sPDCCH PRB set. For each wireless device 14, network node 12 configures a set of sPDCCH candidates per aggregation level which need to be monitored by each wireless device 14 at each short TTI. Those candidates can take any location within the sPDCCH PRB set. Therefore, as one or more embodiments of the disclosure, network node 12 dynamically configures the number of bits of the bit field indicator based on the number of users sharing the same sPDCCH region. Furthermore, network node 12 dynamically configures the sCCE to bit field indicator mapping based on the location of the configured sPDCCH candidates of all wireless devices 14. Thus, the mapping is dynamically defined in an optimal way to efficiently signal those unused sCCEs resources that are utilized for data. The number of bits of the bit field indicator and/or the dynamic mapping configuration is transmitted by network node 12 over higher layer signaling such as RRC to wireless devices 14.

Hence, when network node 12 configures via RRC an sPDCCH PRB set to be shared between multiple wireless devices 14, it also configures via RRC those wireless devices 14 the bit field indicator size and/or the sCCE to bit field indicator mapping.

Figure 15:
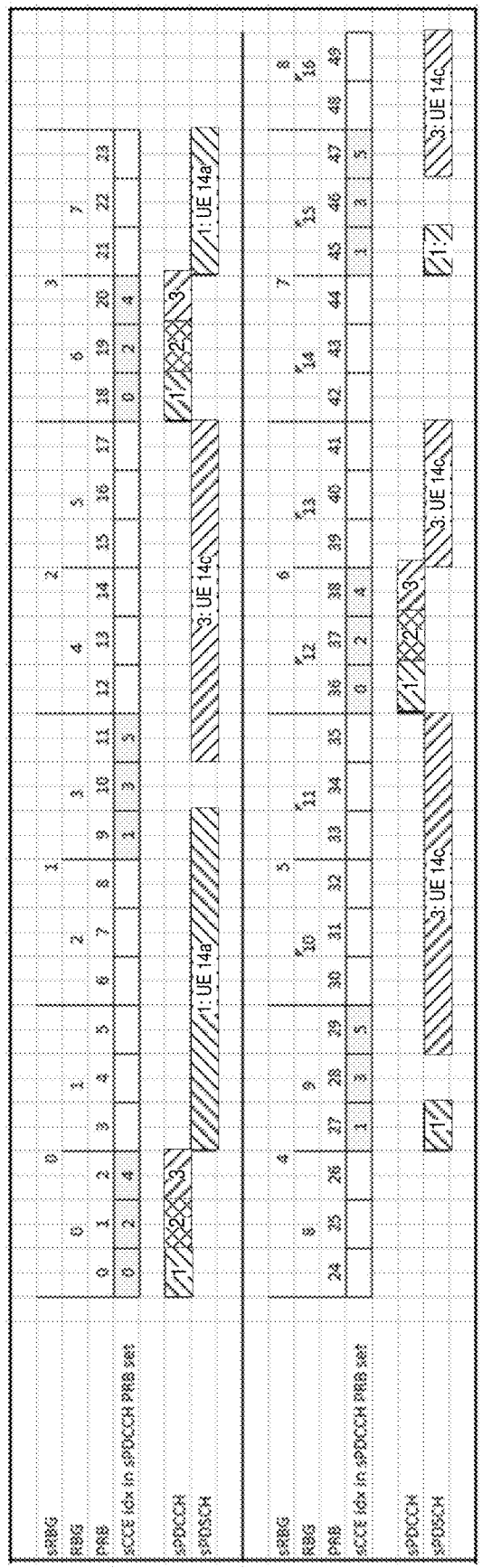
FIG. 15 is an example of the location of sPDCCH and sPDSCH for three wireless devices.

Example of the flexible resource allocation of unused sPDCCH resources for sTTI operation An example of how the bit field indicator is configured is depicted in FIGS. 14-15. The example includes three wireless devices 14 (wireless device 14a (user equipment 1 or UE1), wireless device 14b (UE2), wireless device 14c (UE3)) and a 10 MHz system. Each legacy RBG consists of 3 PRB, leading to 17 bits in the bitmap. In order to reduce the number of bits in the sDCI message, the bitmap is pointed to a sRBG, which is RBG for short TTI. To be able to easily multiplex frequency resources scheduled to wireless devices 14 with short TTI and frequency resources scheduled to wireless devices with legacy/long TTI, it is assumed that the sRBG is an integer multiple of the legacy RBG. Here a double size is used, i.e., 1 sRBG=2RBG=6PRB.

The three wireless devices 14 are configured to share the same sPDCCH PRB set, which consists of 6 sCCEs. The sDCI for each wireless device 14 is transmitted in an AL1 sPDCCH. As shown in FIG. 14, the sPDCCH location of each wireless device 14 is very spread out over the sPDCCH region. Furthermore, FIG. 14 shows the configured resource allocation (RA) and the 3-bit indicator for each wireless device 14. In this example, wireless device 14b (UE 14b) is assumed to receive an UL grant, i.e., wireless device 14b does not get sPDSCH resources. The 3-bit indicator sCCE mapping is based on the definition given in FIG. 12 for AL1 sPDCCH.

As depicted, wireless device 14a (UE 14a) is configured with sRBGs 0, 1 and 3. Wireless device 14-a's bit field indicator is set to 100, which indicates that sCCE1 has been further allocated for sPDSCH. Wireless device 14c (UE 14c) is configured with sRBGs 2, 5, 6 and 8. Wireless device 14c's bit field indicator is set to 001, which indicates that sCCE5 has been further allocated for sPDSCH. As a result, FIG. 15 depicts how unused sCCEs from the sPDCCH region are efficiently allocated to sPDSCH. Consider the case of UE 14a in FIG. 15. The sPDSCH of UE 14a is allocated sRBG 0, 1, 3 according to the resource allocation bitmap. But only the frequency resources of sRBG 0, 1, 3 that were not configured as part of the sPDCCH RB set are actually used for transmitting sPDSCH. Since sPDCCH RB set contains PRBs 0, 1, 2, 9, 10, 11, 18, 19, 20, 27, 28, 29, 36, 37, 38, 45, 46, 47 according to FIG. 15, only PRBs 3, 4, 5, 6, 7, 8, 21, 22, 23 of sRBG 0, 1, 3 are used for sPDSCH. In addition, the bit field indicator of value '100' for UE 14a indicates that some of the frequency resources configured in the sPDCCH RB set are also used for sPDSCH transmission. To determine which frequency resources configured in the sPDCCH RB set are used for sPDSCH of UE 14a, one may refer to FIG. 12. Since sPDCCH of UE 14a occupies sCCE 0, the bit field value '100' means that the frequency resources corresponding to sCCE1 are used for sPDSCH. Referring back to FIG. 14, it is illustrated that sPDSCH of UE 14a also occupies frequency resources corresponding to sCCE 1, i.e., PRB 9, 27 and 45. Due at least in part to the bitfield indicator, 3 additional PRBs can advantageously be used for sPDSCH transmission.

Figure 16:
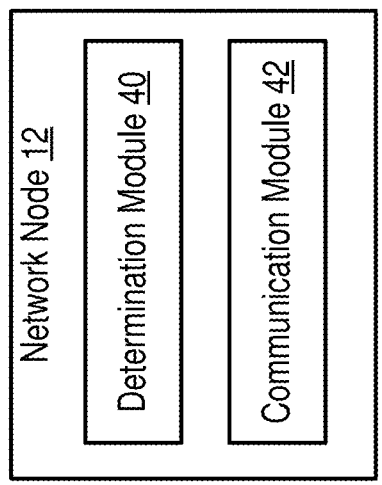
FIG. 16 is a block diagram of another example network node in accordance with the principles of the disclosure.

FIG. 16 is another example of network node 12 in accordance with the principles of the disclosure. Network node 12 includes determination module 40 that is configured to determine a downlink control information, DCI, message, the DCI message including a bit field of at least two bits. In one or more embodiments, each bit corresponding to a group of at least one sCCE of a configured sPDCCH region. Network node 12 includes communication module 42 that is configured to communicate the DCI message to wireless device 14. The bit field indicates whether the group of at least one sCCE is used for data transmission to wireless device 14.

Figure 17:
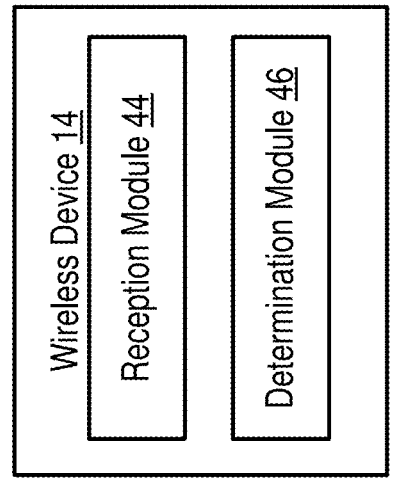
FIG. 17 is a block diagram of another example wireless device in accordance with the principles of the disclosure.

FIG. 17 is another example of wireless device 14 in accordance with the principles of the disclosure. Wireless device 14 includes reception module 44 that is configured to receive a downlink control information, DCI, message, the DCI message including a bit field of at least two bits. Each bit corresponds to a group of at least one sCCE of a configured sPDCCH region. Wireless device 14 includes determination module 46 that is configured to determine resources whether the group of at least one sCCE is used for data transmission based on the DCI message.

Some Embodiments

According to one aspect of the disclosure, a network node 12 for short transmission time interval, sTTI, resource allocation in a communication network is provided. The network node 12 includes processing circuitry 20 configured to: determine a downlink control information, DCI, message, the DCI message including a bit field of at least two bits, each bit corresponding to a group of at least one sCCE of a configured sPDCCH region. Processing circuitry 20 is configured to transmit the DCI message to a wireless device 14. The bit field indicates whether the group of at least one sCCE is used for data transmission to the wireless device 14.

According to one embodiment of this aspect, the number of bits of the at least two bits in the bit field is based on a size of the configured sPDCCH region. According to one embodiment of this aspect, the number of bits of the at least two bits in the bit field is based on a network bandwidth. According to one embodiment of this aspect, the number of bits of the at least two bits in the bit field is based on an aggregation level of the wireless device. According to one embodiment of this aspect, the number of bits of the at least two bits in the bit field is based on a number of wireless devices sharing the same sPDCCH region.

According to one embodiment of this aspect, the number of bits of the at least two bits in the bit field is transmitted using Radio Resource Control, RRC, signaling. According to one embodiment of this aspect, a mapping of the at least two bits to sCCE indices is based on a number of bits and size of the sPDCCH region. According to one embodiment of this aspect, a mapping of the at least two bits to sCCE indices is based on a predefined mapping.

According to one embodiment of this aspect, a mapping of the at least two bits to sCCE indices is based on a location of sPDDCH candidates for wireless devices 14 sharing the same sPDCCH region. According to one embodiment of this aspect, a mapping of the at least two bits to sCCE indices is transmitted via Radio Resource Control, RRC, signaling. According to one embodiment of this aspect, a grouping of sCCEs is based on a location and aggregation level of a sPDCCH candidate associated with the DCI message. According to one embodiment of this aspect, the first wireless device 14 shares the sPDCCH region with a second wireless device 14. According to one embodiment of this aspect, an assignment of sPDCCH candidates for each wireless device 14 is spread out over the sPDCCH region. According to one embodiment of this aspect, the processing circuitry 20 is further configured to transmit a configuration of control resources.

According to one aspect of the disclosure, a method for a network node 12 for short transmission time interval, sTTI, resource allocation in a communication network. A determining a downlink control information, DCI, message is determined. The DCI message includes a bit field of at least two bits. Each bit corresponds to a group of at least one sCCE of a configured sPDCCH region. Transmitting the DCI message to a wireless device 14. The bit field indicates whether the group of at least one sCCE is used for data transmission to the wireless device 14.

According to one embodiment of this aspect, the number of bits of the at least two bits in the bit field is based on a size of the configured sPDCCH region. According to one embodiment of this aspect, the number of bits of the at least two bits in the bit field is based on a network bandwidth. According to one embodiment of this aspect, the number of bits of the at least two bits in the bit field is based on an aggregation level of the wireless device 14. According to one embodiment of this aspect, the number of bits of the at least two bits in the bit field is based on a number of wireless devices 14 sharing the same sPDCCH region.

According to one embodiment of this aspect, the number of bits of the at least two bits in the bit field is transmitted using Radio Resource Control, RRC, signaling. According to one embodiment of this aspect, a mapping of the at least two bits to sCCE indices is based on a number of bits and size of the sPDCCH region. According to one embodiment of this aspect, a mapping of the at least two bits to sCCE indices is based on a predefined mapping.

According to one embodiment of this aspect, a mapping of the at least two bits to sCCE indices is based on a location of sPDDCH candidates for wireless devices 14 sharing the same sPDCCH region. According to one embodiment of this aspect, a mapping of the at least two bits to sCCE indices is transmitted via Radio Resource Control, RRC, signaling. According to one embodiment of this aspect, a grouping of sCCEs is based on a location and aggregation level of a sPDCCH candidate associated with the DCI message.

According to one embodiment of this aspect, the first wireless device 14 shares the sPDCCH region with a second wireless device 14. According to one embodiment of this aspect, an assignment of sPDCCH candidates for each wireless device 14 is spread out over the sPDCCH region. According to one embodiment of this aspect, transmitting a configuration of control resources.

According to one aspect of the disclosure, a wireless device 14 for short transmission time interval, sTTI, resource allocation in a communication network is provided. The wireless device 14 includes processing circuitry 32 configured to receive a downlink control information, DCI, message. The DCI message includes a bit field of at least two bits. Each bit corresponds to a group of at least one sCCE of a configured sPDCCH region. Processing circuitry 32 is configured to determine whether the group of at least one sCCE is used for data transmission based on the DCI message.

According to one embodiment of this aspect, the number of bits of the at least two bits in the bit field is based on a size of the configured sPDCCH region. According to one embodiment of this aspect, the number of bits of the at least two bits in the bit field is based on a network bandwidth. According to one embodiment of this aspect, the number of bits of the at least two bits in the bit field is based on an aggregation level of the wireless device 14.

According to one embodiment of this aspect, the number of bits of the at least two bits in the bit field is based on a number of wireless devices 14 sharing the same sPDCCH region. According to one embodiment of this aspect, the number of bits of the at least two bits in the bit field is transmitted using Radio Resource Control, RRC, signaling. According to one embodiment of this aspect, a mapping of the at least two bits to sCCE indices is based on a number of bits and size of the sPDCCH region. According to one embodiment of this aspect, a mapping of the at least two bits to sCCE indices is transmitted via Radio Resource Control, RRC, signaling. According to one embodiment of this aspect, a grouping of sCCEs is based on a location and aggregation level of a sPDCCH candidate associated with the DCI message.

According to one aspect of the disclosure, a method for a wireless device for short transmission time interval, sTTI, resource allocation in a communication network is provided. A downlink control information, DCI, message is received. The DCI message includes a bit field of at least two bits. Each bit corresponds to a group of at least one sCCE of a configured sPDCCH region. A determination is made whether the group of at least one sCCE is used for data transmission based on the DCI message.

According to one embodiment of this aspect, the number of bits of the at least two bits in the bit field is based on a size of the configured sPDCCH region. According to one embodiment of this aspect, the number of bits of the at least two bits in the bit field is based on a network bandwidth. According to one embodiment of this aspect, the number of bits of the at least two bits in the bit field is based on an aggregation level of the wireless device 14.

According to one embodiment of this aspect, the number of bits of the at least two bits in the bit field is based on a number of wireless devices 14 sharing the same sPDCCH region. According to one embodiment of this aspect, the number of bits of the at least two bits in the bit field is transmitted using Radio Resource Control, RRC, signaling. According to one embodiment of this aspect, a mapping of the at least two bits to sCCE indices is based on a number of bits and size of the sPDCCH region.

According to one embodiment of this aspect, a mapping of the at least two bits to sCCE indices is transmitted via Radio Resource Control, RRC, signaling. According to one embodiment of this aspect, a grouping of sCCEs is based on a location and aggregation level of a sPDCCH candidate associated with the DCI message.

According to one aspect of the disclosure, a network node 12 for short transmission time interval, sTTI, resource allocation in a communication network is provided. The network node 12 includes a determination module 46 configured to determine a downlink control information, DCI, message. The DCI message includes a bit field of at least two bits. Each bit corresponds to a group of at least one sCCE of a configured sPDCCH region. A communication module 42 is configured to transmit the DCI message to a wireless device 14. The bit field indicates whether the group of at least one sCCE is used for data transmission to the wireless device 14.

According to one aspect of the disclosure, a wireless device 14 for short transmission time interval, sTTI, resource allocation in a communication network is provided. The wireless device 14 includes a reception module 44 configured to receive a downlink control information, DCI, message. The DCI message includes a bit field of at least two bits. Each bit corresponds to a group of at least one sCCE of a configured sPDCCH region. The wireless device 14 includes a determination module 46 configured to determine resources whether the group of at least one sCCE is used for data transmission based on the DCI message.

Further embodiments referenced as Embodiment 1A to 14A are described in the following.

Embodiment 1A. Network node scheduling DL transmission, sending DCI message comprising
  a. providing indication of resources used by the downlink data channel
  b. bitfield of more than one bit, wherein each bit represents a group of one or more sCCE of a configured sPDCCH region, and where the bit indicates whether these sCCE are:
    i. not used for data transmission to UE receiving DCI message
    ii. used for data transmission to UE receiving DCI message.

Embodiment 2A Network node of Embodiment 1A where the number of bits in the bitfield depends on the size of the configured sPDCCH region.

Embodiment 3A. Network node of Embodiment 1A where the number of bits in the bitfield depends on the bandwidth.

Embodiment 4A. Network node of Embodiment 1A where the number of bits in the bitfield depends on the UE's sPDCCH aggregation level.

Embodiment 5A. Network node of Embodiment 1A where the number of bits in the bitfield depends on the number of users sharing the same sPDCCH region.

Embodiment 6A. Network node of Embodiment 1A where the number of bits in the bitfield is transmitted by the network via higher layer signaling.

Embodiment 7A. Network node of Embodiment 1A where the mapping from bits to sCCE indices (i.e., how the groups of sCCEs are defined) is calculated dependent on number of bits and size of the sPDCCH region.

Embodiment 8A. Network node of Embodiment 1A where the mapping from bits to sCCE indices is configured by the network based on a pre-defined mapping in specification.

Embodiment 9A. Network node of Embodiment 1A where the mapping from bits to sCCE indices is dynamically configured by the network based on the configured location of the sPDCCH candidates for the users sharing the same sPDCCH region.

Embodiment 10A. Network node of Embodiment 1A where the mapping from bits to sCCE indices is transmitted by the network via higher layer signaling.

Embodiment 11A. Network node of Embodiment 1A to 10A, where the grouping of sCCEs depends on the location and aggregation level of the sPDCCH candidate used to send the DCI message region.

Embodiment 12A. Network node of Embodiment 1A where different users share the same sPDCCH region (same sPDCCH PRB set).

Embodiment 13A. Network node of Embodiment 1A where the assignment of sPDCCH candidates for each user can be spread out over the sPDCCH region.

Embodiment 14A. Network node of Embodiment 1A where the network node dynamically sends configuration of control resources (reconfiguration of resources within the sPDCCH region).

Further, Embodiments Referenced as Embodiment 1 to Embodiment 44 are Described in the Following.

Embodiment 1. A network node 12 for short transmission time interval, sTTI, resource allocation in a communication network, the network node 12 comprising: processing circuitry 20 configured to:
  determine a downlink control information, DCI, message, the DCI message including a bit field of at least two bits, each bit corresponding to a group of at least one sCCE of a configured sPDCCH region; and
  transmit the DCI message to a wireless device 14; and
  the bit field indicating whether the group of at least one sCCE is used for data transmission to the wireless device 14.

Embodiment 2. The network node 12 of Embodiment 1, wherein a number of bits of the at least two bits in the bit field is based on a size of the configured sPDCCH region.

Embodiment 3. The network node 12 of Embodiment 1, wherein a number of bits of the at least two bits in the bit field is based on a network bandwidth.

Embodiment 4. The network node 12 of Embodiment 1, wherein a number of bits of the at least two bits in the bit field is based on an aggregation level of the wireless device 14.

Embodiment 5. The network node 12 of Embodiment 1, wherein a number of bits of the at least two bits in the bit field is based on a number of wireless devices 14 sharing the same sPDCCH region.

Embodiment 6. The network node 12 of Embodiment 1, wherein a number of bits of the at least two bits in the bit field is transmitted using Radio Resource Control, RRC, signaling.

Embodiment 7. The network node 12 of Embodiment, 1 wherein a mapping of the at least two bits to sCCE indices is based on a number of bits and size of the configured sPDCCH region.

Embodiment 8. The network node 12 of Embodiment 1, wherein a mapping of the at least two bits to sCCE indices is based on a predefined mapping.

Embodiment 9. The network node 12 of Embodiment 1, wherein a mapping of the at least two bits to sCCE indices is based on a location of sPDDCH candidates for wireless device 14 sharing the same sPDCCH region.

Embodiment 10. The network node 12 of Embodiment 1, wherein a mapping of the at least two bits to sCCE indices is transmitted via Radio Resource Control, RRC, signaling.

Embodiment 11. The network node 12 of Embodiment 1, wherein a grouping of sCCEs is based on a location and aggregation level of a sPDCCH candidate associated with the DCI message.

Embodiment 12. The network node 12 of Embodiment 1, wherein the wireless device 14 shares the sPDCCH region with a second wireless device 14.

Embodiment 13. The network node 12 of Embodiment 1, wherein an assignment of sPDCCH candidates for each wireless device 14 is spread out over the sPDCCH region.

Embodiment 14. The network node 12 of Embodiment 1, wherein the processing circuitry 20 is further configured to transmit a configuration of control resources.

Embodiment 15. A method for a network node 12 for short transmission time interval, sTTI, resource allocation in a communication network, the method comprising:
 determining a downlink control information, DCI, message, the DCI message including a bit field of at least two bits, each bit corresponding to a group of at least one sCCE of a configured sPDCCH region (Block S100); and
 transmit the DCI message to a wireless device 14 (Block S102); and
 the bit field indicating whether the group of at least one sCCE is used for data transmission to the wireless device 14.

Embodiment 16. The method of Embodiment 15, wherein a number of bits of the at least two bits in the bit field is based on a size of the configured sPDCCH region.

Embodiment 17. The method of Embodiment 15, wherein a number of bits of the at least two bits in the bit field is based on a network bandwidth.

Embodiment 18. The method of Embodiment 15, wherein a number of bits of the at least two bits in the bit field is based on an aggregation level of the wireless device 14.

Embodiment 19. The method of Embodiment 15, wherein a number of bits of the at least two bits in the bit field is based on a number of wireless devices sharing the same sPDCCH region.

Embodiment 20. The method of Embodiment 15, wherein a number of bits of the at least two bits in the bit field is transmitted using Radio Resource Control, RRC, signaling.

Embodiment 21. The method of Embodiment 15, wherein a mapping of the at least two bits to sCCE indices is based on a number of bits and size of the sPDCCH region.

Embodiment 22. The method of Embodiment 15, wherein a mapping of the at least two bits to sCCE indices is based on a predefined mapping.

Embodiment 23. The method of Embodiment 15, wherein a mapping of the at least two bits to sCCE indices is based on a location of sPDDCH candidates for wireless devices 14 sharing the same sPDCCH region.

Embodiment 24. The method of Embodiment 15, wherein a mapping of the at least two bits to sCCE indices is transmitted via Radio Resource Control, RRC, signaling.

Embodiment 25. The method of Embodiment 15, wherein a grouping of sCCEs is based on a location and aggregation level of a sPDCCH candidate associated with the DCI message.

Embodiment 26. The method of Embodiment 15, wherein the first wireless device 14 shares the sPDCCH region with a second wireless device 14.

Embodiment 27. The method of Embodiment 15, wherein an assignment of sPDCCH candidates for each wireless device 14 is spread out over the sPDCCH region.

Embodiment 28. The method of Embodiment 15, further comprising transmitting a configuration of control resources.

Embodiment 29. A wireless device (14) for short transmission time interval, sTTI, resource allocation in a communication network, the wireless device (14) comprising:
 processing circuitry 32 configured to:
 receive a downlink control information, DCI, message, the DCI message including a bit field of at least two bits, each bit corresponding to a group of at least one sCCE of a configured sPDCCH region; and
 determine whether the group of at least one sCCE is used for data transmission based on the DCI message.

Embodiment 30. The wireless device 14 of Embodiment 29, wherein a number of bits of the at least two bits in the bit field is based on a size of the configured sPDCCH region.

Embodiment 31. The wireless device 14 of Embodiment 29, wherein a number of bits of the at least two bits in the bit field is based on a network bandwidth.

Embodiment 32. The wireless device 14 of Embodiment 29, wherein a number of bits of the at least two bits in the bit field is based on an aggregation level of the wireless device 14.

Embodiment 33. The wireless device 14 of Embodiment 29, wherein a number of bits of the at least two bits in the bit field is based on a number of wireless devices 14 sharing the same sPDCCH region.

Embodiment 34. The wireless device 14 of Embodiment 29, wherein a number of bits of the at least two bits in the bit field is transmitted using Radio Resource Control, RRC, signaling.

Embodiment 35. The wireless device 14 of Embodiment 29, wherein a mapping of the at least two bits to sCCE indices is based on a number of bits and size of the sPDCCH region.

Embodiment 36. The wireless device 14 of Embodiment 29, wherein a mapping of the at least two bits to sCCE indices is transmitted via Radio Resource Control, RRC, signaling.

Embodiment 37. The wireless device 14 of Embodiment 29, wherein a grouping of sCCEs is based on a location and aggregation level of a sPDCCH candidate associated with the DCI message.

Embodiment 38. A method for a wireless device 14 for short transmission time interval, sTTI, resource allocation in a communication network, the method comprising:
 receiving a downlink control information, DCI, message, the DCI message including a bit field of at least two bits, each bit corresponding to a group of at least one sCCE of a configured sPDCCH region (Block S104); and
 determining whether the group of at least one sCCE is used for data transmission based on the DCI message (Block S106).

Embodiment 39. The method of Embodiment 38, wherein a number of bits of the at least two bits in the bit field is based on a size of the configured sPDCCH region.

Embodiment 40. The method of Embodiment 38, wherein a number of bits of the at least two bits in the bit field is based on a network bandwidth.

Embodiment 41. The method of Embodiment 38, wherein a number of bits of the at least two bits in the bit field is based on an aggregation level of the wireless device 14.

Embodiment 42. The method of Embodiment 38, wherein a number of bits of the at least two bits in the bit field is based on a number of wireless devices sharing the same sPDCCH region.

Embodiment 43. The method of Embodiment 38, wherein a number of bits of the at least two bits in the bit field is transmitted using Radio Resource Control, RRC, signaling.

Embodiment 44. The method of Embodiment 38, wherein a mapping of the at least two bits to sCCE indices is based on a number of bits and size of the sPDCCH region.

Embodiment 45. The method of Embodiment 38, wherein a mapping of the at least two bits to sCCE indices is transmitted via Radio Resource Control, RRC, signaling.

Embodiment 46. The method of Embodiment 38, wherein a grouping of sCCEs is based on a location and aggregation level of a sPDCCH candidate associated with the DCI message.

Embodiment 47. A network node 12 for short transmission time interval, sTTI, resource allocation in a communication network, the network node 12 comprising:

a determination module 40 configured to determine a downlink control information, DCI, message, the DCI message including a bit field of at least two bits, each bit corresponding to a group of at least one sCCE of a configured sPDCCH region; and a communication module 42 configured to transmit the DCI message to a wireless device 14; and the bit field indicating whether the group of at least one sCCE is used for data transmission to the wireless device 14.

Embodiment 48. A wireless device 14 for short transmission time interval, sTTI, resource allocation in a communication network, the wireless device 14 comprising:

a reception module 44 configured to receive a downlink control information, DCI, message, the DCI message including a bit field of at least two bits, each bit corresponding to a group of at least one sCCE of a configured sPDCCH region; and a determination module 46 configured to determine whether the group of at least one sCCE is used for data transmission based on the DCI message.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

In the following, further embodiments according to the present disclosure will be described.

Section 1: Introduction

In Radio Access Network 1—Radio layer 1 (RAN1)#85, initial discussion on UE search space for short TTI (sTTI) operation took place. The following conclusion was made.

From resource utilization perspective, sPDSCH assigned by a sPDCCH can be mapped to resources that are left unused by any sPDCCH Details are for further study, e.g., FFS, whether unused resources are on RB or RE level In RAN1 #86, the following was agreed, among others.

Legacy PDCCH can be used to transmit sDCI (DCI for sPDSCH and/or sPUSCH).

In RAN1 #87 the following was agreed, among others.
  A UE can be dynamically (with a subframe to subframe granularity) scheduled with legacy TTI unicast PDSCH and/or short TTI unicast PDSCH
In RAN1 #89 the following agreements were made:
  A CRS based sPDCCH RB set can be configured to a UE by higher-layer signalling either with distributed or localized mapping of sCCE to sREG
    FFS definition of localized mapping
  A UE 14 can be configured to monitor at most two sPDCCH RB set(s) containing the sTTI USS in an sTTI.
  One sPDCCH candidate is contained within one RB set
  An sREG consists of 1 RB within 1 OFDM symbol including REs for CRS and/or DMRS applied to CRS based sPDCCH
  SFBC is supported for CRS-based sPDCCH
    FFS number of antenna ports
  Single port DMRS-based sPDCCH demodulation is supported
    FFS bundling size
  FFS if two port DMRS-based sPDCCH demodulation is supported
    FFS bundling size
  A sPDCCH RB set can be configured with at least the following information:
    A set of RBs
      EPDCCH PRB allocation is reused
    Transmission scheme (e.g., CRS-based or DMRS-based)
      FFS: Dependent on subframe type
    Localized or distributed sCCE to sREG mapping (at least for CRS, and, if supported DMRS-based sPDCCH)
    FFS: Localized or distributed sPDCCH candidate to sCCE mapping
    Number of sPDCCH candidates/aggregation levels of the RB set
      FFS: Same or different sPDCCH candidates for different sTTI index
    Number of symbols for sPDCCH duration at least in case of CRS-based transmission
    RS scrambling sequence (e.g., VCID) in case of DMRS-based transmission
    FFS: other information (if needed)
  The number of OFDM symbols per RB set for DMRS based sPDCCH for 1-slot sTTI is 2
  The number of OFDM symbols for DMRS based sPDCCH for ⅔-symbol sTTI is
    2 for 2-symbol sTTI #1,2,3,4
    FFS: 3 for 3-symbol sTTI #1 and #5
    FFS: sTTI #0

In the described embodiments, it is discussed how sPDCCH can be designed to allow for a flexible control region per sTTI and an efficient multiplexing of sPDCCH with PDSCH and sPDSCH.

Section 2: Discussion

To schedule sTTI, a sPDCCH needs to be included in each sTTI. In some embodiments, it is described in a way to achieve dynamic adaptation of the sPDCCH region, more specifically to efficiently reuse for sPDSCH resources left unused by sPDCCH.

Section 2.1: Relevant Demodulation Combinations for sPDCCH and sPDSCH

The straight-forward combinations to support are CRS based sPDCCH with CRS based sPDSCH and DMRS based sPDCCH with DMRS based sPDSCH.

In case of DMRS based sPDCCH and sPDSCH, FDM between 2os sPDCCH and 2os sPDSCH is preferable to enable independent precoding for sPDSCCH and sPDSCH. In case of slot TTI, separate DMRS pairs for control and data can be achieved in the same PRB.

To avoid the DMRS overhead and in case no particular beamforming scheme is wanted for sPDCCH, the combination CRS sPDCCH and DMRS sPDSCH is attractive. In case of 2os TTI, it is preferable not to allow TDM between CRS-based sPDCCH and DMRS-based sPDSCH in 2/3os sTTI. Otherwise, the UE 14 has to do rate matching around the DMRS positions of sPDSCH to detect its sDCI. To achieve the same BLER, a larger AL or more sREG/sCCE are needed to compensate for the larger RS overhead. In case of a 3os long sTTI, it is possible to have 1os CRS based sPDCCH and 2os DMRS based sPDSCH in the same PRB.

The last combination, i.e., DMRS sPDCCH and CRS sPDSCH, could be considered but there is no use case for it and thus no strong need to support it. In case of slot TTI, it is possible to have sPDCCH and sPDSCH in the same PRB multiplexing in time domain. Note that as discussed in [11], it is considered that for slot TTI, sDCI for sTT10 is sent in legacy PDCCH region if PDCCH length >1. For the same reason as mentioned earlier, in case of 2os TTI, FDM is preferred between DMRS based sPDCCH and CRS based sPDSCH. The following is proposed:

Proposal 1: CRS based sPDCCH can schedule a CRS based sPDSCH or a DMRS based sPDSCH
  Proposal 2: DMRS based sPDCCH schedules a DMRS based sPDSCH
  Proposal 3: FDM is supported in a PRB between sPDCCH and a DMRS based 2os sPDSCH Section 2.2: Flexible sPDCCH Region System level evaluation in [1] showed how important it is to have a flexible sPDCCH region in sTTI. At low load where the highest benefits of sTTI are expected, only few resources are needed for sPDCCH due to few co-scheduled UE 14 and due to high SINR. Assuming a fixed region for sPDCCH often leads to unnecessary high overhead in terms of unused resources. It may thus be critical to design sPDCCH so that the amount of occupied resources is adapted to the number of co-scheduled UEs 14 (in DL and UL) and their required aggregation level. The resources not occupied by the sPDCCH may be used by sPDSCH as also described in [2]. Some details are given below on how to inform the UE 14 of which sPDCCH resources which are unused such that sPDSCH can be mapped to those.

Note that this scheme may be used for both 2os TTI and slot TTI. As mentioned previously, this may be of particular importance for 2os TTI due to the scarcity of resources in such a short TTI. For slot TTI optimizing, the control overhead may be less crucial since more resources are available for data and at least for a PDCCH length >1, sDCI may be transmitted in the legacy PDCCH region. However, since a scheme for reusing sPDCCH resources left unused for sPDSCH is needed for 2os TTI, it can be applied as well for slot TTI.

Section 2.2.1: UE Configuration of sPDCCH Locations

Figure 18:
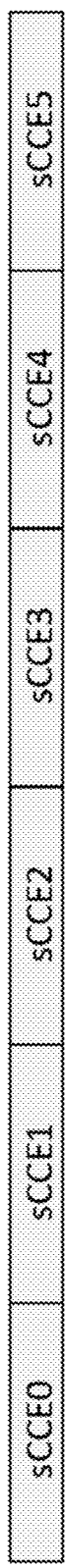
FIG. 18 is a diagram of a logical sPDCCH region consisting of six sCCE.
Figure 19:
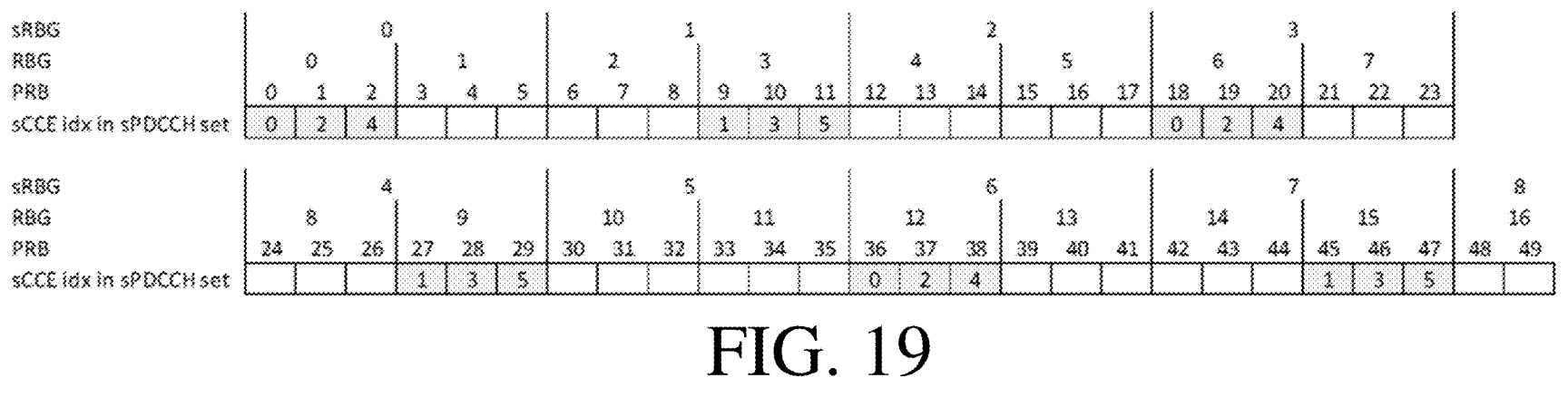

The locations to search for sPDCCH can be configured over RRC. Each UE 14 is configured with (at least) one sPDCCH set of locations to search for sDCI. These configurations can be separate for different UEs 14, or overlapping for two or more UEs 14. In FIG. 18 and FIG. 19, an example is given for a configured sPDCCH set with distributed placement, indicating that PRB 0-2, 9-11, 18-20, 27-29, 36-38 and 45-47 can potentially be used for sPDCCH. In this example, these six groups coincide with six RBG used for DL resource allocation type 0 for the 1-ms TTI UEs 14.

The six configured sCCEs are represented in logical domain in FIG. 18. These are distributed over the configured set of PRBs according to the sCCE indices shown in FIG. 19. As each sREG consists of 12 RE, one sCCE consists of three sREGs placed in three out of the six configured groups, e.g., sCCE0 consists of the sREGs placed in PRB 0, 18 and 36.

Depending on configuration, the sPDCCH set can be configured frequency distributed (as in the example), or localized. It can also be configured to use one, or more than one, symbols for sPDCCH.

Section 2.2.2: Multiplexing sPDCCH with sPDSCH/PDSCH

As pointed out in [3], the RB group (sRBG) size for short TTI may be increased by a factor 2 or 3 compared to the RB group (RBG) size of 1 ms TTI operation, in order to limit the number of resource allocation (RA) allocation bits in the sDCI. The UEs 14 search for sDCI in the configured sPDCCH search space. Each found DL sDCI informs the UE about the sPDSCH frequency allocation that can be based on a bitmap indicating the scheduled sRBGs. In this way, co-existence with legacy allocation type 0 scheduling is ensured. It is proposed:

Proposal 4: Define a sRBG that can be used for sTTI scheduling, containing a multiple of RBG used for 1 ms TTI operation.

Using many sRBG for transmitting the sDCI to sTTI users (e.g. a separate sRBG per sTTI user) does not allow an efficient multiplexing with PDSCH, in particular in case of UL sDCI transmission. Each sRBG used for sDCI blocks, may prevent one (or more if the granularity of RBG is increased for sTTI) legacy RBG for usage by PDSCH of 1 ms TTI UEs 14. It is proposed:

Proposal 5: For efficient sPDCCH/PDSCH multiplexing, support location of sDCI for different sTTI UEs 14 in the same(s) RBG If sPDCCH resources of only one UE 14 can be part of a sRBG, the UE 14 knows the resource elements used for its sPDCCH and the remaining resource elements can be used for its sPDSCH. Following proposal 2, if sPDCCH resources of more than one UE 14 can be part of a sRBG, each UE does not know which resource elements of the sRBG were used for sending sDCI to the other UEs 14. To make it work, more information may need to be signalled to the UE 14 to indicate which of the REs in a sRBG are used for sPDSCH.

In order to multiplex sPDSCH and sPDCCH, while letting resources not used by sPDCCH be used by sPDSCH, a restriction may be added so that any PRB indicated by the sRBG bitmap are only used if they are not present in the search space configured to the UE for sPDCCH over RRC. This enables the eNB to configure the same sPDCCH-PRB-set containing PRBs in the same sRBG to different sTTI UEs for a more efficient sPDCCH/sPDSCH multiplexing and with no ambiguity on the resource elements used for sPDSCH. It is proposed:

Proposal 6: For efficient sPDCCH/sPDSCH multiplexing among multiple sTTI UEs, the PRBs used for sPDSCH are the one indicated by the RA allocation field of sDCI excluding the PRBs belonging to the configured sPDCCH-PRB-set.

As a consequence of proposal 3, a DL UE 14 may only be scheduled resources within the sPDCCH resources if explicitly told so by a flag in the sDCI message. The reuse of sPDCCH resources left unused can be performed in the logical domain on sCCE level. It is proposed:

Proposal 7: The DL sDCI contains an indicator whether remaining sPDCCH resources are used for sPDSCH Section 2.2.2.1 Consecutive sCCE Utilization within the PRB Set In the simplest case, a one-bit indication would be sufficient. For instance, if this bit field is set to 1, the UE 14 uses sCCE resources with logical index larger than the one containing the sPDSCH assignment. If the field is set to false, none of the resources that were configured for sPDCCH, are used by this UE 14. If many UEs 14 share the same configured sPDCCH resources, only one UE 14 can be given a "1".

Figure 20:
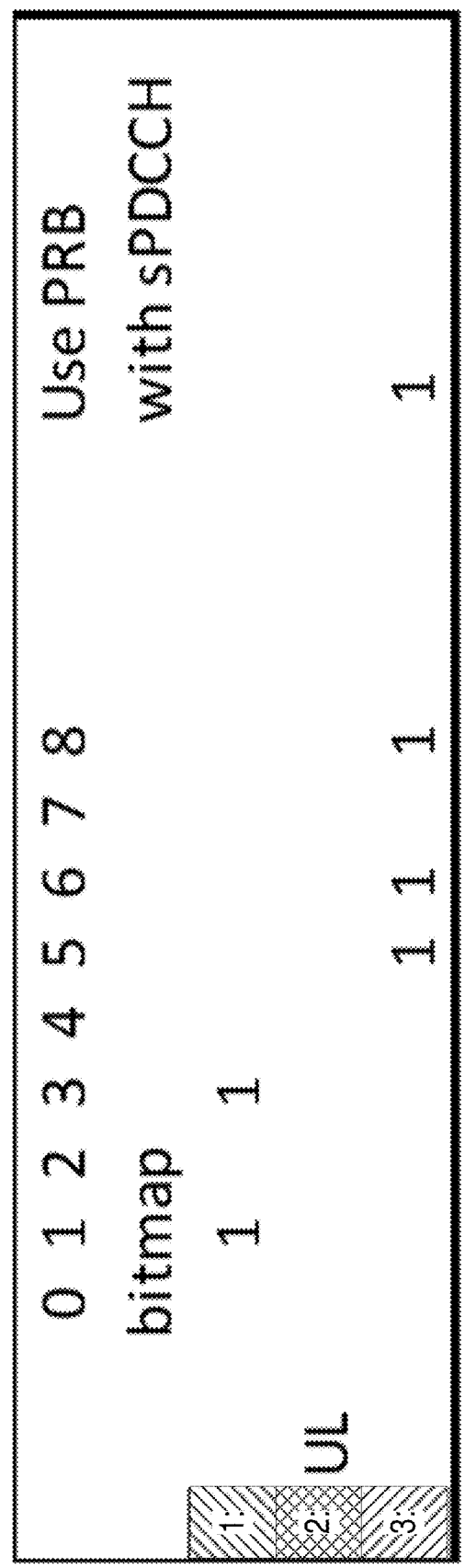
FIG. 20 is an example scheduling bitmap for one uplink and one downlink users/wireless device.

In FIG. 20, an example of this is shown for 3 UEs (UE 14a-14c), where the DL users use this bitmap and extra bit.

Figure 21:
FIG. 21 is a diagram of sDCI messages in logical sPDCCH region.

Now assume that these three UEs 14 are given the same configured sPDCCH region, as defined in FIG. 19 (Example of configured sPDCCH resources and scheduling of sPDSCH for three UEs 14. Top of FIG. 19 shows lower 24 PRB, bottom of FIG. 19 shows higher 26 PRB of a 10 MHz carrier). If each of these three UEs are configured with aggregation level 1, the sPDCCH resources from FIG. 18 could be used according to FIG. 21, where the last three sCCE indices are left unused. As UE 14c gets the flag, the remaining resources (sCCE 3, 4, 5) will then be used for UE 14c DL data.

Figure 22:
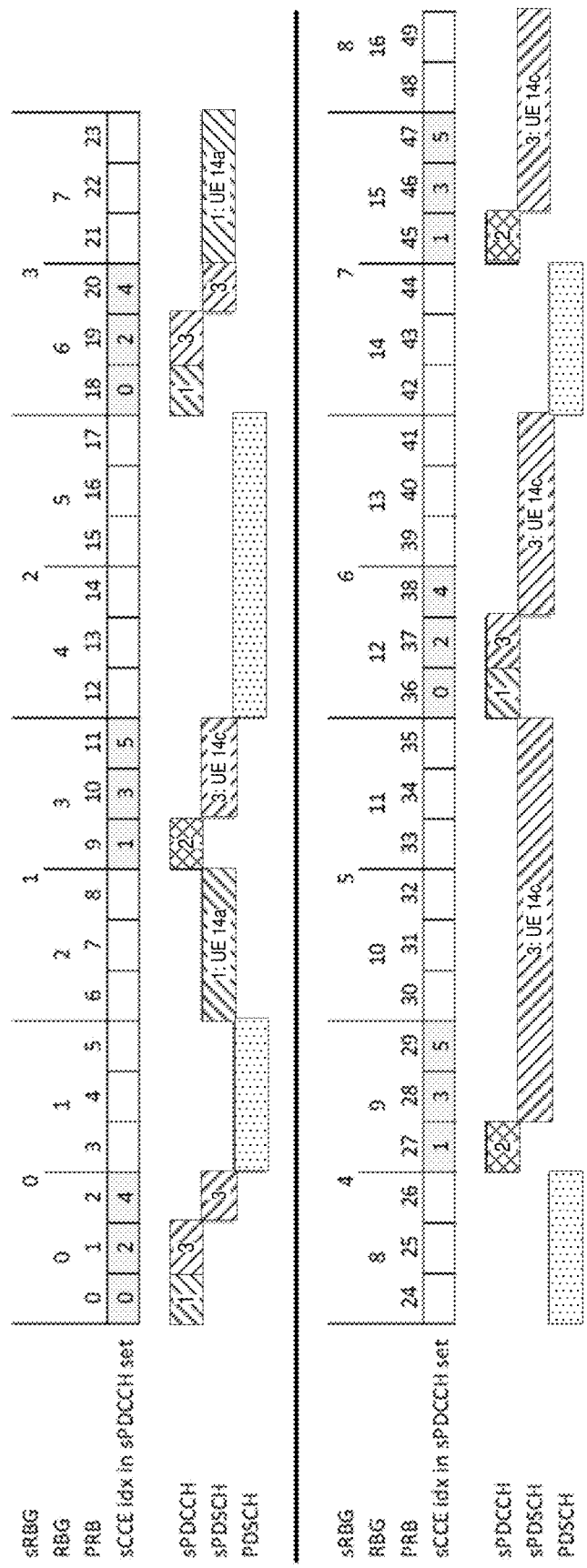
FIG. 22 is a diagram of example of configured sPDCCH resources and scheduling of sPDSCH for three users/wireless devices, where each sCCE consists of three sREG.

Applying the sPDCCH configuration from FIG. 19 together with the bits in FIG. 20, the resulting bandwidth utilization shown in FIG. 22 (Top shows lower 24 PRB, bottom shows higher 26 PRB). According to the bitmap, UE 14a gets sRBG 1 and 3. Then UE 14a will not use the full sRBG1, since PRB 9-11 are in its configured sPDCCH set, and similarly for sRBG3. Thereby, UE 14a will use resources in PRB 6-8 and 21-23. UE 14b gets a UL grant and thus no DL resources. UE 14c, finally, is given sRBG 5, 6, 8. It can use full sRBG 5 and 8, since no configured sPDCCH region is placed there, and uses parts of sRBG 6 (PRB 39-41). UE 14c is given the flag, indicating use of remaining sPDCCH resources. Since it decoded its DCI message on sCCE location 2, it then knows that all resources corresponding to sCCE location 3 and upwards are used for UE 14c data allocation, as shown in the figure.

Figure 23:
FIG. 23 is a diagram of sDCI messages for three UEs/wireless devices within a logical sPDCCH region of eight sCCEs.

As seen in FIG. 22, legacy PDSCH scheduling with resource allocation type 0 is possible. In this example, RBG 1,4,5,8 and 14 are free to use, either for PDSCH, or for scheduling another group of short T UEs 14 configured with another sPDCCH set. It is observed:

Observation 1: If multiple UEs 14 share the same sPDCCH PRB set, 1-bit indicator would be sufficient to indicate utilizing unused sPDCCH resources for sPDSCH in case of allocating consecutive logical sDCI Section 2.2.2.2 Non-Consecutive sCCE Utilization within the PRB Set Since the eNB 12 may have sufficient flexibility to assign the UE's sPDCCH candidates [4], the used sPDCCH candidates for different UEs 14 may actually be placed in different positions within the sPDCCH PRB set rather than consecutively. This configuration is depicted in FIG. 23 for a sPDCCH PRB set of 8 sCCE. In this example, the sPDCCH PRB set is shared between three users: UE 14a, UE 14b and UE 14c. There, UE 14a gets an AL1 sPDCCH located in sCCE #1 containing a DL assignment, UE 14b gets an AL2 sPDCCH located in sCCEs #4,5 containing an UL grant, and UE 14c gets an AL2 sPDCCH located in sCCEs #6,7 containing a DL assignment.

As described before for the simplest case depicted in FIG. 21, a 1-bit indicator would be sufficient. However, in case non-consecutive sCCEs are occupied by different UEs 14 as depicted in FIG. 23 a more elaborate indicator may be needed to efficiently utilize the unused sCCEs for data. An indicator of up to three bits provides enough options to reuse unused sPDCCH resources. The sCCEs of the configured PRB set can be organized in 3 groups that can be individually allocated to a sPDSCH UE 14 with a bitmap of 3 bits. The grouping of the sCCEs of a PRB set can be done so that the sCCEs that build the sPDCCH candidate where the UE 14 found its sDCI are not considered. This enables optimization of the usage of the few available bits (there might be no use in being able to indicate a sCCE/PRB that was already used for sending sDCI).

Figure 24:
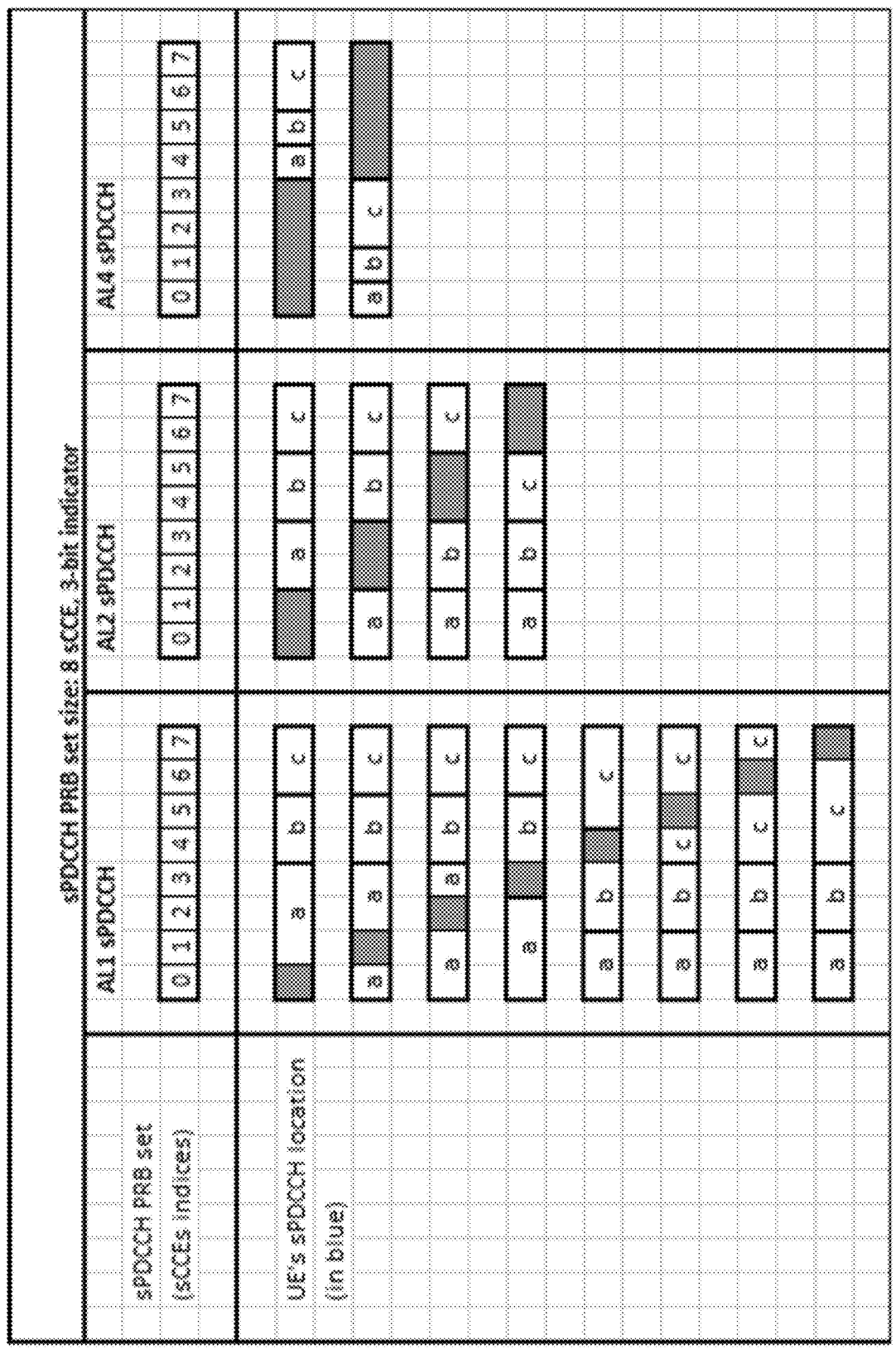
FIG. 24 is a diagram of an example of sCCE to 3-bit indicator mapping definition for a sPDCCH PRB set of eight sCCEs and up to AL4.

An example of grouping the 8 sCCE of a PRB set for ALs up to AL 4 is illustrated in FIG. 24. In FIG. 24, "abc" represent the three bits of the bitfield indicator. Hence, e.g., when an AL1 sPDCCH is located in sCCE0, bit "a" points to the possible reuse of sCCEs {1, 2, 3}, bit "b" points to sCCEs {4, 5} and bit "c" points to sCCEs {6, 7}.

Figure 26:
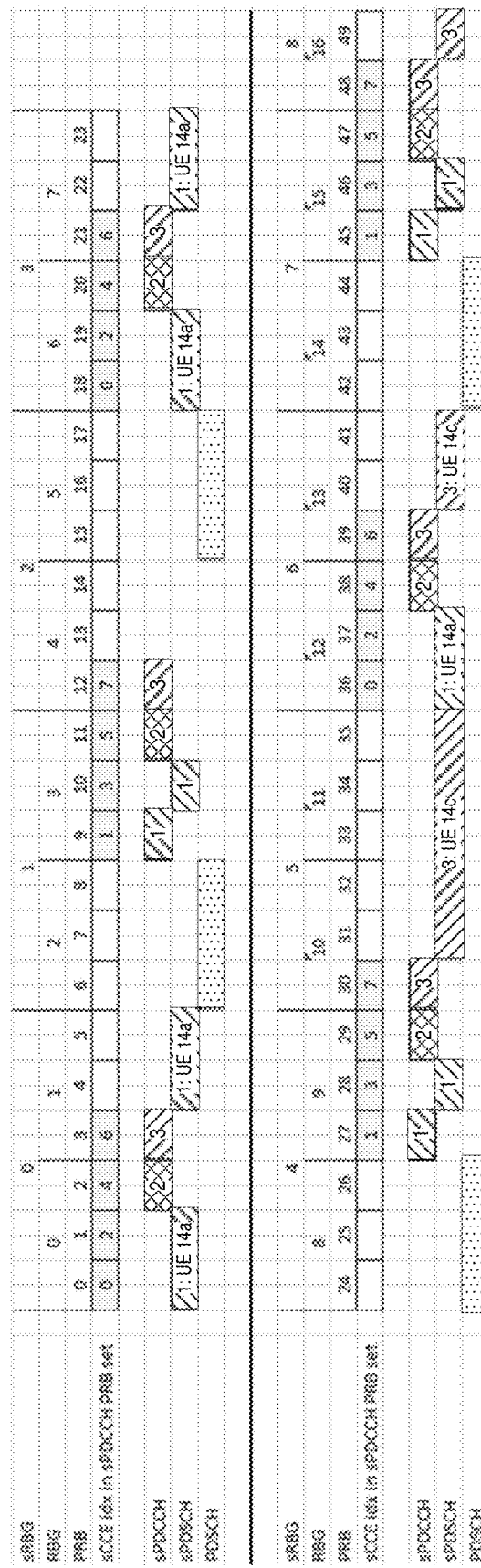
FIG. 26 is a diagram of an example of configured sPDCCH resources and scheduling of sPDSCH for three users/wireless devices, where each sCCE consists of three sREG.

In FIG. 25, an example of this is shown for these three UEs 14a-14c receiving sDCI as in FIG. 23, where the DL UEs 14 get a resource allocation (RA) bitmap and a 3-bit indicator to inform about utilizing unused sCCEs for sPDSCH. Based on this, in FIG. 26 a 3-bit indicator is included in DL sDCI to indicate utilizing unused sCCEs for sPDSCH. Top portion of FIG. 26 shows the lower 24 PRB, while the bottom portion of FIG. 26 shows higher 26 PRB, thereby depicting the resulting bandwidth utilization. From the described 3-bit indicator mapping, for UE 14a receiving the AL1 sPDCCH in sCCE, the 3-bit indicator set to "100" refers bit "a" is set to "1". This indicates that the unused sCCE0, sCCE2 and sCCE3 resources have been allocated for sPDSCH, as showed in FIG. 26. It can be noted that there are no restrictions related to the location of UL sDCI or DL sDCI within the sPDCCH region in order to efficiently utilize unused sCCE resources for sPDSCH. It is proposed:

Proposal 8: An indicator with up to three bits is included in DL sDCI to efficiently utilize unused sPDCCH resources for sPDSCH.

Section 2.2.3: Coexistence of sPDCCH for 2-Symbol and 1-Slot sTTI

A question is whether a UE 14 configured for 2-symbol sTTI should be configured the same sPDCCH resources as a 1-slot sTTI UE. Applying the scheme above with an indicator that remains configured for sPDCCH resources can be used for sPDSCH, a slot-sTTI UE 14 is not aware of any 2-symbol TTI UEs 14 in the same sPDCCH region, and cannot adapt its sPDSCH resource allocation depending on smaller timescales than the slot-length TTI. This case was analyzed and illustrated in [5]. If slot-length UEs 14 get the indication to use remaining resources, it allows for the exploitation of sPDCCH resources left unused by UEs 14 receiving sDCI for 2-symbols sPUSCH. However, 2-symbols UEs 14 receiving DL assignment may not be able to reuse these resources for data during an entire slot. This restriction is known by the eNB 12 in the scheduling. It is up to the eNB 12 to let the most suitable UEs 14 reuse the resources left unused by sPDCCH. It is observed:

Observation 2: Letting both 2-symbol UEs 14 and slot-sTTI UEs 14 share the same sPDCCH resources improves frequency resource utilization.

Observation 3: Letting 2-symbol UEs 14 and slot-sTTI UEs 14 share the same sPDCCH may lead to some scheduling restrictions when reusing unused sPDCCH resources for data, but the eNB 12 is aware of this and can choose accordingly between same or separate sPDCCH resources. It is proposed:

Proposal 9: Both 2-symbol sTTI and 7-symbol sTTI UEs 14 can share the same configured sPDCCH resources.

In section 2, above, the following observations were made:

| | |
|---|---|
| Observation 1 | If multiple UEs 14 share the same sPDCCH PRB set, 1-bit indicator would be sufficient to indicate utilizing unused sPDCCH resources for sPDSCH in case of allocating consecutive logical sDCI |
| Observation 2 | Letting both 2-symbol UEs 14 and slot-sTTI UEs 14 share the same sPDCCH resources improves frequency resource utilization. |
| Observation 3 | Letting 2-symbol UEs 14 and slot-sTTI UEs14 share the same sPDCCH may lead to some scheduling restrictions when reusing unused sPDCCH resources for data, but the eNB 12 is aware of this and can choose accordingly between same or separate sPDCCH resources. |

Based on the discussion in section 2, the following is proposed:

| | |
|---|---|
| Proposal 1 | CRS based sPDCCH can schedule a CRS based sPDSCH or a DMRS based sPDSCH. |
| Proposal 2 | DMRS based sPDCCH schedules a DMRS based sPDSCH. |
| Proposal 3 | FDM is supported in a PRB between sPDCCH and a DMRS based 2os sPDSCH. |
| Proposal 4 | Define a sRBG that can be used for sTTI scheduling, containing a multiple of RBG used for 1 ms TTI operation. |
| Proposal 5 | For efficient sPDCCH/PDSCH multiplexing, support location of sDCI for different sTTI users in the same (s)RBG. |
| Proposal 6 | For efficient sPDCCH/sPDSCH multiplexing among multiple sTTI users, the PRBs used for sPDSCH are the one indicated by the RA allocation field of sDCI excluding the PRBs belonging to the configured sPDCCH-PRB-set. |
| Proposal 7 | The DL sDCI contains an indicator whether remaining sPDCCH resources are used for sPDSCH. |
| Proposal 8 | An indicator with up to three bits is included in DL sDCI to efficiently utilize unused sPDCCH resources for sPDSCH. |
| Proposal 9 | Both 2-symbol sTTI and 7-symbol sTTI UEs can share the same configured sPDCCH resources. |

Section 2: References

[1] R1-163312, System level evaluation of short TTI, Ericsson, 3GPP TSG RAN WG1 Meeting #84 bis, Ericsson Busan, 11-15 Apr. 2016.

[2] TR 36.881 v14.0.0, Study on latency reduction techniques for LTE.

[3] R1-1706075, Design aspects of sPDSCH, Ericsson, 3GPP TSG RAN WG1 Meeting #88bis, April 2017.

[4] R1-1712896, Search space for sTTI, Ericsson, 3GPP TSG RAN WG1 Meeting #90, August 2017, which was published on the priority date of the instant disclosure.

[5] R1-1708864, Multiplexing sPDCCH with sPDSCH/PDSCH, Ericsson, RAN1 #89, May 2017.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node for short transmission time interval, sTTI, resource allocation in a communication network, the network node comprising:
processing circuitry configured to:
determine a downlink control information, DCI, message, the DCI message including a bit field of at least two bits, each bit corresponding to a group of at least one short Control Channel Element, sCCE, of a configured short Physical Downlink Control Channel, sPDCCH, region; and
transmit the DCI message to a wireless device; and
the bit field indicating whether the group of at least one sCCE is used for data transmission to the wireless device.

2. The network node of claim 1, wherein the data transmission is short Physical Downlink Shared Channel, sPDSCH, data transmission.

3. The network node of claim 1, wherein at least a portion of the configured sPDCCH region is used for short Physical Downlink Shared Channel, sPDSCH, data transmission.

4. The network node of claim 1, wherein each group of the at least one sCCE corresponds to a same quantity of sCCEs.

5. The network node of claim 1, wherein each bit corresponds to a respective group of non-overlapping sCCEs.

6. The network node of claim 1, wherein the group of at least one sCCE corresponds to a sCCE for transmission of the DCI message and at least one sCCE for the data transmission.

7. The network node of claim 1, wherein each sCCE has a respective sCCE index; and
a mapping of the at least two bits to sCCE indices is based on a number of bits and size of the configured sPDCCH region.

8. The network node of claim 1, wherein each sCCE has a respective sCCE index; and
a mapping of the at least two bits to sCCE indices is based on a predefined mapping.

9. The network node of claim 1, wherein a grouping of sCCEs is based on a location and aggregation level of a sPDCCH candidate associated with the DCI message.

10. The network node of claim 1, wherein the wireless device shares the sPDCCH region with a second wireless device.

11. The network node of claim 1, wherein an assignment of sPDCCH candidates for each wireless device is spread out over the sPDCCH region.

12. A method for a network node for short transmission time interval, sTTI, resource allocation in a communication network, the method comprising:
determining a downlink control information, DCI, message, the DCI message including a bit field of at least two bits, each bit corresponding to a group of at least one short Control Channel Element, sCCE, of a configured short Physical Downlink Control Channel, sPDCCH, region; and
transmitting the DCI message to a wireless device; and
the bit field indicating whether the group of at least one sCCE is used for data transmission to the wireless device.

13. A wireless device for short transmission time interval, sTTI, resource allocation in a communication network, the wireless device comprising:
processing circuitry configured to:
receive a downlink control information, DCI, message, the DCI message including a bit field of at least two bits, each bit corresponding to a group of at least one short Control Channel Element, sCCE, of a configured short Physical Downlink Control Channel, sPDCCH, region; and
determine whether the group of at least one sCCE is used for data transmission based at least in part on the bit field of the DCI message.

14. The wireless device of claim 13, wherein the data transmission is short Physical Downlink Shared Channel, sPDSCH, data transmission.

15. The wireless device of claim 13, wherein at least a portion of the configured sPDCCH region is used for short Physical Downlink Shared Channel, sPDSCH, data transmission.

16. The wireless device of claim 13, wherein each group of the at least one sCCE corresponds to a same quantity of sCCEs.

17. The wireless device of claim 13, wherein each bit corresponds to a respective group of non-overlapping sCCEs.

18. The wireless device of claim 13, wherein the group of at least one sCCE corresponds to a sCCE for transmission of the DCI message and at least one sCCE for the data transmission.

19. The wireless device of claim 13, wherein each sCCE has a respective sCCE index; and
a mapping of the at least two bits to sCCE indices is based on a number of bits and size of the configured sPDCCH region.

20. The wireless device of claim 13, wherein each sCCE has a respective sCCE index; and
a mapping of the at least two bits to sCCE indices is based on a predefined mapping.

21. The wireless device of claim 13, wherein a grouping of sCCEs is based on a location and aggregation level of a sPDCCH candidate associated with the DCI message.

22. The wireless device of claim 13, wherein the wireless device shares the sPDCCH region with another wireless device.

23. The wireless device of claim 13, wherein an assignment of sPDCCH candidates for each wireless device is spread out over the sPDCCH region.

24. A method for a wireless device for short transmission time interval, sTTI, resource allocation in a communication network, the method comprising:
receiving a downlink control information, DCI, message, the DCI message including a bit field of at least two bits, each bit corresponding to a group of at least one short Control Channel Element, sCCE, of a configured short Physical Downlink Control Channel, sPDCCH, region; and determining whether the group of at least one sCCE is used for data transmission based at least in part on the bit field of the DCI message.

\* \* \* \* \*